United States Patent [19]
Hedgcoth

[11] Patent Number: 6,036,824
[45] Date of Patent: *Mar. 14, 2000

[54] MAGNETIC RECORDING DISK SPUTTERING PROCESS AND APPARATUS

[75] Inventor: Virgle L. Hedgcoth, Pomona, Calif.

[73] Assignee: Magnetic Media Development LLC, Manhattan Beach, Calif.

[ * ] Notice: This patent is subject to a terminal disclaimer.

[21] Appl. No.: 08/851,473

[22] Filed: May 5, 1997

Related U.S. Application Data

[62] Division of application No. 08/588,617, Jan. 19, 1996, Pat. No. 5,626,970, which is a continuation of application No. 08/250,521, May 27, 1994, abandoned, which is a division of application No. 07/822,589, Jan. 17, 1992, Pat. No. 5,316,864, which is a division of application No. 07/464,339, Jan. 12, 1990, Pat. No. 5,082,747, which is a division of application No. 07/210,119, Jun. 22, 1988, Pat. No. 4,894,133, which is a division of application No. 06/926,676, Nov. 3, 1986, abandoned, which is a division of application No. 06/796,768, Nov. 12, 1985, Pat. No. 4,735,840.

[51] Int. Cl.[7] .................................................. C23C 14/34
[52] U.S. Cl. ............................... 204/192.16; 204/192.12; 204/192.15
[58] Field of Search ........................ 204/192.12, 192.15, 204/192.16, 192.2, 298.07, 298.09, 298.12, 298.13, 298.23, 298.25, 298.26

[56] References Cited

U.S. PATENT DOCUMENTS

| | | | |
|---|---|---|---|
| Re. 32,464 | 7/1987 | Aine .......................................... | 428/622 |
| 3,019,125 | 1/1962 | Eggenberger et al. ...................... | 117/8 |
| 3,161,946 | 12/1964 | Birkenbeil ................................ | 29/155.5 |
| 3,167,449 | 1/1965 | Spacil ........................................ | 117/200 |
| 3,294,670 | 12/1966 | Charschan et al. ....................... | 204/298 |
| 3,342,632 | 9/1967 | Bate et al. ................................. | 117/217 |
| 3,466,156 | 9/1969 | Peters et al. ............................... | 29/195 |
| 3,472,751 | 10/1969 | King ......................................... | 204/192 |
| 3,515,606 | 6/1970 | Crowther .................................. | 156/3 |

(Abstract continued on next page.)

FOREIGN PATENT DOCUMENTS

| | | | |
|---|---|---|---|
| 0140513 | 5/1985 | European Pat. Off. .......... | G11B 5/60 |
| 53-123906 | 10/1978 | Japan .............................. | G11B 5/82 |
| 54-9176 | 1/1979 | Japan ............................. | C23C 15/00 |
| 54-18125 | 7/1979 | Japan .............................. | G11B 5/84 |
| 59-82626 | 5/1984 | Japan . | |

OTHER PUBLICATIONS

"Anisotropy in thin-film media—origins and applications (invited)", by W.G. Haines, J. Appl. Phys. 61 (8) Apr. 15, 1987.

"Influence of substrate texture on recording parameters for CoNiCr rigid disk media", by Seagle et al., J. Appl. Phys, 61 (8) Apr. 15, 1987.

"Circular Orientation in Sputtered Magnetic Disks", by Dr. R.G. Johanson, Circuits Processing Apparatus, Inc., Feb. 10, 1986.

(List continued on next page.)

*Primary Examiner*—Nam Nguyen
*Assistant Examiner*—Steven H. VerSteeg
*Attorney, Agent, or Firm*—Price Gess & Ubell

[57] ABSTRACT

A process is provided for producing a thin-film magnetic longitudinal recording disk having a coercive anisotropy with a larger coercivity in a circumferential direction than in a radial direction of a disk. A substrate textured with circumferential grooves is provided. The textured substrate is then heated and a thin-film nucleating layer is sputtered above the textured substrate. Subsequently, a thin film magnetic layer of a hexagonal close-packed cobalt alloy is deposited above the nucleating layer.

89 Claims, 12 Drawing Sheets

U.S. PATENT DOCUMENTS

| | | | |
|---|---|---|---|
| 3,516,860 | 6/1970 | Simmons | 117/236 |
| 3,520,664 | 7/1970 | York | 29/195 |
| 3,521,765 | 7/1970 | Kauffman et al. | 214/17 |
| 3,754,178 | 8/1973 | Dormehl et al. | 318/572 |
| 3,761,333 | 9/1973 | Kleinbeck | 156/64 |
| 3,787,237 | 1/1974 | Grunberg et al. | 117/239 |
| 3,872,786 | 3/1975 | Ballard | 100/461 |
| 3,968,018 | 7/1976 | Lane et al. | 204/192 |
| 3,996,095 | 12/1976 | Ahn et al. | 156/610 |
| 4,074,016 | 2/1978 | Trippel | 428/626 |
| 4,079,169 | 3/1978 | Nigh et al. | 428/636 |
| 4,152,487 | 5/1979 | Yanagisawa | 428/621 |
| 4,236,946 | 12/1980 | Aboaf et al. | 148/108 |
| 4,245,008 | 1/1981 | Michaelsen et al. | 428/611 |
| 4,254,189 | 3/1981 | Fisher | 428/626 |
| 4,277,540 | 7/1981 | Aine | 428/627 |
| 4,287,225 | 9/1981 | Kneller et al. | 427/48 |
| 4,303,489 | 12/1981 | Morrison, Jr. | 204/192 R |
| 4,313,815 | 2/1982 | Graves, Jr. et al. | 204/298 |
| 4,326,229 | 4/1982 | Yanagisawa | 360/135 |
| 4,333,792 | 6/1982 | Smith | 156/612 |
| 4,411,963 | 10/1983 | Aine | 428/622 |
| 4,414,287 | 11/1983 | Kneller et al. | 428/650 |
| 4,426,265 | 1/1984 | Brunsch et al. | 204/192 M |
| 4,472,259 | 9/1984 | Class et al. | 204/298 |
| 4,500,407 | 2/1985 | Boys et al. | 204/298 |
| 4,503,125 | 3/1985 | Nelson et al. | 428/408 |
| 4,514,451 | 4/1985 | Suzuki et al. | 428/141 |
| 4,537,832 | 8/1985 | Kohmoto et al. | 428/216 |
| 4,552,820 | 11/1985 | Lin et al. | 428/611 |
| 4,554,217 | 11/1985 | Grimm et al. | 428/469 |
| 4,568,600 | 2/1986 | Ono et al. | 428/145 |
| 4,575,408 | 3/1986 | Bok | 204/192 E |
| 4,578,729 | 3/1986 | Suzuki et al. | 360/134 |
| 4,604,179 | 8/1986 | Eltoukhy et al. | 204/298 |
| 4,610,911 | 9/1986 | Opfer et al. | 428/213 |
| 4,626,336 | 12/1986 | Bloomquist et al. | 204/298 |
| 4,631,612 | 12/1986 | Shiiki et al. | 360/125 |
| 4,639,815 | 1/1987 | Arai et al. | 360/131 |
| 4,698,251 | 10/1987 | Fukuda et al. | 428/64 |
| 4,735,840 | 4/1988 | Hedgcoth | 428/65 |
| 4,749,465 | 6/1988 | Flint et al. | 204/298 |
| 4,816,127 | 3/1989 | Eltoukhy | 204/192.15 |
| 4,880,514 | 11/1989 | Scott et al. | 204/192.2 |
| 4,894,133 | 1/1990 | Hedgcoth | 204/192.15 |
| 4,950,535 | 8/1990 | Arioka et al. | 428/536 |
| 5,082,747 | 1/1992 | Hedgcoth | 428/611 |
| 5,316,864 | 5/1994 | Hedgcoth | 428/611 |
| 5,626,970 | 5/1997 | Hedgcoth | 428/611 |

OTHER PUBLICATIONS

Microstructure and Crystallography of Textured CoCrTa/Cr Recording Media, by T.P. Nolan and R. Sinclair, Ultramicroscopy 47 (1992) pp. 437–446, North–Holland.

Transmission Electron Microscopic Analysis of Microstructural Features in Magnetic Recording Media, by T.P. Nolan and R. Sinclair et al., IEEE Transactions on Magnetics, vol. 29, No. 1, Jan. 1993.

Crystallographic Orientation of Textured CoCrTa/Cr Sputtered Thin Film Media for Longitudinal Recording, by T.P. Nolan and R. Sinclair et al., J.Appl.Phys. 73(10) May 15, 1993, pp. 1517–1524.

Mitsubishi v. Hedgcoth, USDC Northern District of CA, C–95–20800–JW, Order Re Patent Claims, Apr. 17, 1996.

Mitsubishi v. Hedgcoth, USDC Northern District of CA, C–95–20800–JW, Declaration of John Corbani Apr. 29, 1996.

In–Plane Anisotropy in Thin–Film Media: Physical Origins of Orientation Ratio (Invited), by Johnson et al., IEEE Transactions on Magnetics, vol. 31, No. 6, Nov. 1995.

Mitsubishi v. Hedgcoth, U.S.D.C. N. District of CA, C95–20800 JW, Recommendations of the Special Master Regarding Motions for Summary Judgment, May 17, 1996.

Mitsubishi v. Hedgcoth, U.S.D.C. N. District of CA, C95–20800 JW, Tentative Ruling re Motion for Clarification of Order, May 2, 1996.

Mitsubishi v. Hedgcoth, U.S.D.C. N. District of CA, C95–20800 JW, Defendant Hedgcoth's Memo of Points and Authorities in Opposition to Plaintiffs' Motion for Summary Judgement or Invalidity of U.S.P. Nos. 4,735,840, 4,894, 134, 5,082,747, and 5,136,863, Apr. 29, 1996.

TriMedia GS Series, 1985.

Surface Analysis Service Report, Surface Science Laboratories, Inc., Feb. 10, 1984.

Cyberdisk Competitor Analysis, by Alcan International Limited, Oct. 11, 1985.

Thin film for magnetic recording technology: A review by J. Howard, Journal of Vacuum Science and Technology, 2nd Series, vol. 4, No. 1, Jan./Feb. 1986.

Xerox Magnetics, 1983.

Effect of Microstructural Features on Media Noise in Longitudinal Recording Media, by T.P. Nolan and R. Sinclair et al., J.App.Phys. 73(10) May 15, 1993, pp. 5566–5568.

Stress–Induced anisotropy in Co–Cr thin films, by P. Mitchell et al., J. Appl. Phys. 63(8), Apr. 1988.

Microstructure and Magnetic Properties of Thin–Film Co–Ni–Pt for Longitudinal Recording, by N. Mahvan et al.m, IEEE Transactions on Magnetics, vol. 26, No. 5, Sep. 1990.

Influence of substrate texture on recording parameters for CoNiCr rigid disk media, by D. Seagle et al., J. Appl. Phys. 61(8) Apr. 15, 1987.

The Relationship of Switching Distribution to Tape Digital Output, by D. Richards et al., J. App. Phys. 49(3) 1978.

E. Teng et al. IEEE Transactions on Magnetics, vol. MAGk–22, No. 1, Sep. 1986 Magnetic Anisotropies in Sputtered Thin Film Disks, by S. Uchinami, IEEE Transactions on Magnetics, vol. MAG–23, No. 5, Sep. 1987.

Mitsubishi v. Hedgcoth, U.S.D.C. N. District of CA, C95–280800 JW, Defendant's Reply Brief and Opposition to Plaintiffs' Motion for Summary Judgment, Sep. 28, 1995.

Mitsubishi v. Hedgcoth, U.S.D.C. N. District of CA, C94–1971 SAW (JSB), Plaintiff's Pretrial Brief.

Mitsubishi v. Hedgcoth, U.S.D.C. N. District of CA, C94–1971 SAW (JSB), Defendant's Reply Brief to Plaintiff's Opposition to Def. Hedgcoth's Motion for Summary Judgment, Apr. 29, 1996.

Electron microscopy investigations of the structure and properties of thin film rigid disks, by D.R. Srinivasan et al., Journal of Magnetism and Magnetic Materials, 113 (1992) 47–57.

Microstructure and magnetic properties of very thin CoCr films deposited on different underlayers by rf–sputtering, by G. Pan et al., Journal of Magnetism and Magnetic Materials 113 (1992) 21–28.

Microstructural origin of in–plane magnetic anisotropy in magnetron in–line sputtered CoPtCr thin film disks, by M. Kim et al., American Institute of Physics 1993.

"Introduction to Solid State Physics", by Ch. Kittel, John Wiley & Sons, 1956, one (1) page.

American National Standards Institute, ANSI X3.120–1984, Contact start–stop storage disk—95840 flux transitions per track 7.874–in (200–mm) outer diameter and 2.500–in (63.5–mm) inner diameter.

American National Standards Institute, ANSI X3.128–1986, Contact start–stop storage disk—83000 flux transitions per track 130–mm (5.118–inc) outer diameter and 40–mm (1.575–in) inner diameter.

SEMI 1985, D1–85, Specification for physical and mechanical characteristics of 40mm ×130mm finished nickel plated substrates for rigid disks.

SEMI 1986, 1987, D2–86, Semi specification for aluminum substrates for rigid disks.

Handbook of Thin Film Technology, by Maissel et al., Chapter 6, 1970, 1983 Reissue.

"Sputtering Increases Advantages of Thin–Film Media", by N. Mackintosh et al., Computer Technology Review, Dec. 18, 1984).

"Coating Magnetic Storage Disks", by D. Rogalla, IBM Technical Disclosure Bulletin, Apr. 1969.

Experimental Studies Using In–Contact Recording on Chromuim–Cobalt Films, by Lazzari et al., IEEE Transactions on Magnetics, vol. Mag–5, No. 4, Sep. 1969.

"Thin Evaporative Films with High Coercive Force", by Lazzari et al., IEEE Transactions on Magnetics, vol. Mag–3, No. 3, Sep. 1967.

Media Considerations: Part Four: "Sputtered Options", by V. Hedgcoth, Head/Media Conference, Jul. 14, 1985.

Tencor Manuar, "Alpha–step 200", Nov. 1983.

Alar Report, vol. 1, No. 2, Feb. 1983, Ampex Disc Media Operations.

"Alar Media Process Allows Production of High–Quality Thin–Film Media", by B. McFaarren, Computer Techn. Review vol. IV, No. 4, Dec. 18, 1984.

"Surface Texture (Surface Roughness Waviness, and Lay)" ANSI/ASME B46.1–1985.

"The Electrodeposition of Thin Magnetic Permalloy Films", by R. Girard, Journal of Applied Physics, vol. 38, No. 3, Mar. 1, 1967.

Magnetic Recording Materials Since 1975, Geoffrey Bate, Journal of Magnetism and Magnetic Materials 100 413–424, 1991.

Different Methods of Assessing Switching Field Distributions OS Magnetic Recording Media, E.P. Wohlfarth, IEEE Trans. On Magnetics, vol. Mag 20, No. 1.

Structure and Properties of Sputtered Carbon Overcoats on Rigid Magnetic Media Disks, Tsai and D.B. Bogy J.Vac.Sci Tech. A6(4) Jul./Aug. 1988.

The Dependence of the Microstructure and Magnetic Properties of CoCiCR/Cr Thin Films on the Substrate Temperature . S.L. Duan et al. IEEE Trans on Magnetics, vol. 26, No. 5, Sep. 1990.

Modulation and Crystallographic Orientation Of Sputtered CoNi/Cr Disks for Longitudinal Recording. Ohno et al. IEEE Trans on Magneticw, vol. Mag 23,#5 Sep. 1987.

Critical Review: Characterization of Diamondlike Carbon Films and Their Applications as Overcoats on Thin–Film Media for Magnetic Recording. Tsai and D. B. Bogy. J.Vac. Sci. Technol. A 5(6) Nov./Dec. 1987.

Degradation of Co–based thin–film recording materials in selected corrosive environments, R.R. Dubin, K.D. Winn, L.P. Davis, R.A. Cutler, J. App. Phys 53(3) Mar. 1982.

Effects of Crystal Texture on the Magnetic Properties of Thin HCP Co–Ni Film Glvung J. Lee and Debasis Baral, 1985 Intermag.

Magnetic Recording Media Prepared by Oblique Incidence, IEEE Transaction on Magnetics, vol. Mag–17, No. 6 Nov. 1981, Eiji Kita, Kimiteru Tagawa, Masafumi Kamikubota and Akira Tasaki pp. 3193–3195.

Structure, Internal Stress and Magnetic Properties of Electrodeposited Co–Ni Alloys, IEEE Transactions on Magnetics, vol. Nag–14, No. 5 Sep. 1978, S. Armayanov and M. Maksimov, pp. 855–857.

Texture and Morphology of Sputtered Cr Thin Films, J. App. Phs. 57 (1), 4/15/ Hyung J. Lee, pp. 4037–4039.

Electron Microscopy on High–Coercive–Force Co–Cr Composite Films IEEE Transactions on Magnetics, vol. Mag–6, No. 4, Dec. 1970, Jacques Daval & Denis Randet pp. 768–773.

Microstructure and Magnetic Properties of CoCr Thin films Formed on Ge Layer, M. Futamoto, Y. Honda, H. Kakibayashi & K. Yoshida, 1985 Intermag.

Sequentially Evaporated Thin Film of Bi and Co–Ni with High Coercive Force, K. Yazawa and H. Musava, Intermag.

Radio Frequency Sputtered NiFe films on Au, J. Vac. Sci. Technol., 17(2) Mar.–Apr. 1980, K.Y. Ahn, pp. 626–627.

Recording Performance and Magnetic Characteristics of Sputtered Cobalt–Nickel Tungsten Films, LEEETransactions on Magnetics, vol. Mag–17, No. 6, Nov. 19, R.D. Fischer, L. Herte, A. Lang.

Summary Abstract: Thin films for magnetic recording technology: A review, J. Vac. Sci. Technol. A3(3), May–Jun. 1985, J.K. Howard.

Hard Magnetic Films for Magnetic Recording, IBM Technical Disclosure Bulletin, vol. 21, No. 10, Mar. 1979, K.Y. Ahn & K.N. Tu.

The Optimization of Sputtered Co–Cr Layered Medium for Maximum Areal Density, IEEE Transactions on Magnetics, vol. Mag–17, No. 6, Nov. 1981, W.T. Maloney.

Effect on ion bombardment during deposition on magnetic film properties, J. Vac. Sci. Technol. 18(2) Mar. 1981, L.F. Herte and A. Lang Jr.

Vacuum–deposited thin–metal–film disk by E.M. Rossi et al., J. Appl Phys. 55(6) Mar. 15, 1984.

Datapoint Thin Film Med. F. King., Jul. 1981, IEEE Transactions on Magnetics vol.Mag–17, No. 4.

CoNiCr/Cr Sputtered Thin Film Disks, T. Yamada, N. Tani, M. Ishikawa, Y. Ota K. Nakamura and A. Itoh, Leee Transactions on Magnetics, vol. Mag–21, No. 5, Sep. 1985.

Anisotropy Induced Signal Waveform Modulation of DC Magnetron Sputtered Thin Film Disks, E. Teng. N. Ballard, Lin Data Corporation, LEEE Transactions on Magnetics, vol. Mag–No. 5, Sep. 1986.

Effects of process parameters on low frequency modulation on sputtered disks for longitudinal recording, F.A. Hill, S. Reineck, and K. Poell Vac. Sci. Technol. A4(3), May/Jun. 1986.

Obliquely Evaporated iron–cobalt and iron–cobalt–chromium thin film recording media, T.C. Arnoldussen, E.M. Rossi, A. Ting, IBM Corporation Magnetic Recording Institue, A. Brunach, J. Schneider, G. Trippel, LEEE Transactions on Magnetics vol. Mag–20, No. 5, Sep. 1984.

Silicon–on–Insulator by Graphoepitaxy and Zone–Melting Recrystallization of Patterned Films, Journal of Crystal Growth 63 (1983) 527–546.

Journal of Vacuum Science & Technology, vol. 17, No. 2, Mar./Apr. 1980 pp. 626–628.

Sputtered Multilayer Films for Digital Magnetic Recording, by W.T. Maloney, IEEE Transactions on Magnetics vo. Mag. 15, No. 3, Jul. 1979 pp. 1135–1137.

RF–Sputtered Chromium–Cobalt Films For High–Density Lingitudinal Magnetic Recording, by W.T. Maloney, IEEE Transactions, Mag. 15, No. 6, Nov. 1979.

Surface Texture (Surface Roughness Waviness, and Lay), NASI/ASME B46.1—1985, Published by The America Society of Mechanical Engineers.

High Density Magnetic Recording Heads. F. Jeffers, Proceedings of the IEEE, vol. 74, No. 11, Nov. 1986.

Magnetic Recording Systems. R.W. Wood, Proceedings of the IEEE, vol. 74 No. 11, Nov. 1986 pp. 1557–1569.

Technology in Compact and High Recording Density Disk Storage., Reizo Kaneko et al, IEEE Trans. on Magnetics vol. Mag 18, No. 6. Nov. 1982 pp. 1221–1226.

Particulate Recording Materials, Geoffrey Bate, Proceedings of the IEEE, vol. 74, No. 11, Nov. 1986 pp. 1513–1525.

Fundamentals of the Magnetic Recording Process, H. Neal Bertram Proceedings of the IEEE, vol. 74, No. 11, Nov. 1986.

Zur Textur Von Elektrolytisch Abgeschiedenem Eisen Aus Salsauren Losungen./ The Texture of Electrolytically Deposited Iron from Hydrochloric Acid Solutions. Professor Dr. N.A. Pangarov, Dr. Dipl.–Ing. G. S. Sotivova, Galvenotechnik, 1975 No. 10 pp. 821–824 (Translation of Document AR on Sheet 17).

Hedgcoth Deposition, vol. I, p. 81, Line 24, to p. 106, Line 12, Dec. 8, 1997.

Hedgcoth Deposition, vol. II, p. 130, Line 8, to p. 139, Line 11, and p. 140, Line 14, to p. 148, Line 19, Dec. 9., 1997.

Hedgcoth Deposition, vol. V, P. 578, Line 20, to P. 580, Line 23, Dec. 12, 1997.

Hedgcoth Deposition, vol. VI, P. 611, Line 24, to P. 613, Line 11, and P. 622, Line 5, to P. 630, Line 4, Dec. 15, 1997.

Hedgcoth Deposition, vol. VII, P. 745, Line 20, to P. 751, Line 2, Dec. 16, 1997.

Hedgcoth Edited Video Tape, Dec. 1997.

Magnetic And Structural Properties of Rh Substituted Co–Cr Alloy Films with Perpendicular Magnetic Anisotropy. Kobayashi et al J.Appl. Phys. 52(3), Mar. 1981, pp. 2453–2455.

Alar Report. vol. 1, No. 3 (Ampex Disc Media Operations) May 1983.

Graphoepitaxy of Electrodeposited Tin. Applied Physics letters 40(11) Am. Inst. Phys. L.S. Darken & D.H. Lowndes, Jun. 1, 1982.

Underlayer–Induced Readback Signal Modulation In Double–Layer Perpendicular Media. E. Simpson etal. IEEE Trans on Magnetics, vol. Mag 20, No. 5, pp. 782–784 Sep. 1984.

Angular Variation of the Coercivityin Magnetic Recording Thin Films.

J.S. Gau et al. J. Appl. Phys. 57(1), pp. 3988–3990, Apr. 15, 1985 Thin–Film Recording Media. Arnoldussen Proceeding of IEEE vol. 74. No. 11. Nov. 1986.

Microstructure and Magnetic Properties of Electroless Co–P Thin Films Grown on an Aluminum Base Disk Substrate. Chen et al, J. Appl Phys. 48(3) pp. 1816–1818, Mar. 1978.

Magnetic Disks: Storage Densities on the Rise. R. White, IEEESpectrum Aug. 1983.

A Critical Review of Magnetic Recording Materials, Geoffrey Bate, IEEE Trans. on Magnetics, vol. Mag 5 No. 4, Dec. 1969.

An Analytical Model of the Write Process in Digital Magnetic Recording. M.L. Williams et al. AIP CF Proceedings, Am, Ins of Phys pp. 738–742, 1971.

An Analysis for the Magnetization Mode of High Density Magnetic Recording. S. Iwasaki et al, IEEE Trans on Magnetics, vol. Mag 13, No. 5 pp. 12–72, Sep. 1977.

Control of Crystallographic Texture in Magnetic Thin Films for Ultra–High Density Storage Media, S. Guruswamy, J.E. Shield, and M. Tarakei, Scripta Materilia, vol. 39, Nos. 4/5, pp. 647–652, May 15, 1998 Elsevier Science Ltd' Perpendicular Anisotropy Constants and Anisotropy Energy of Oriented Cobalt–Chromium Alloys Fisher et al. IEEE Trans. on Magnetics, vol. Mag–20, No. 5 Sep. 1984, pp. 806–808.

Characterization of Crystallographic Texture In Co–Based Media, Clemens et al, presented at the Institution for Information Storage Technology, Magnetic Media Symposium II, School of Engineering, Santa Clara University, Santa Clara, CA on Dec. 15–16 1997.

In–Plane Anisotropy In Thin–Film Media Analyzed By Grazing Incidence X–Ray Diffraction. T. Hirose, H. Teranishi, M. Ohsawa, A. Ueda, O. Ishiwata, T. Ataka, K. Ozawa, S. Komiya, A. Iida, IEEE Transactions on Magnetics, vol. 33, No. 5, pt.1, pp. 2971–2973. Sep. 1997.

Crystallographic Anisotropy in Thin Film Magnetic Recording Media Analyzed with X–Ray Diffraction, Kataoka et al. JAppl. Phys. 73(11) Jun. 1, 1993.

Magnetism–Magnetizing of Thin Cobalt Coats Deposited Through Electrolysis on Platinum, C.R. Academy Sci. Paris, t. 261 Groupe 5 Procopiu et al Jul. 12, 1965.

Microstructural Origin of In–Plane Magnetic Anisotropy in Magnetron In–Line Sputtered CoPtCr Thin–Film Disks, J. Appl. Phys. 74(7), Kim et al Oct. 1, 1993.

Magnetic Properties of Cobalt Thin Films Deposited on a Scratched Substrate. Thin Solid Films, 6 Elsevier Sequoia S.A., Lausanne I. Viscrian, 1970.

On the Subject of Magnetizing of Thin Cobalt Coats Deposited on Copper by Means of Electrolysis, 14(9) Rev. Roum. Phys. pp. 1085–1088 Procopiu et al 1969.

Initial Disclosure of Seagate Technology Inc. Pursuant to Federal Rules of Civil Procedure 26(a) and Local Rule 16–5.

Defendant Hitachi Metals America, Ltd. Initial Disclosure of Prior Art Under Patent L.R.2–1(d).

Initial Disclosure Under Rule 26(a) and Civil Local Rule 16–5(b).

Seagate Technology Inc.'s Initial Disclosure Under Local Patent Rule 2–1(d) Local Rule 16–7 (d–f).

Defendant HMT Technology Corporation's Initial Disclosure Statement Pursuant to Fed. R. Civ. P 26(a)(1) and Civil L.R. 16–5.

Effect of Surface Roughness on Magnetic Properties of Films. R.J. Prosen, B.E. Gran, and J. Kivel, Journal of Applied Physics vol. 34, No. 4 Part 2 Apr. 1963.

The Effect of Surface Roughness on the Susceptibility on Thin Permalloy Films. , R.J. Fairholme and K.D. Leaver, Brit.J. Appl. Phys. (J.Phys.D), Ser.2, vol. 2, 1969.

Summary Abstract: Thin Films for Magnetic Recording Technology: A Review J.K. Howard, J. Vac.Sci. Tech. A. vol. 3, No. 3, May/Jun. 1985.

Preferred Orientation of Electrodeposited Cobalt Crystallities. N.A. Pangarov and S. D. Vitkova, Electrochimica Acta, 1996 vol. 11 pp. 1733–1745.

6,036,824

MAGNETIC RECORDING DISK SPUTTERING PROCESS AND APPARATUS

This is a divisional application under 37 C.F.R. Section 1.60 of prior application Ser. No. 08/588,617, filed on Jan. 19, 1996 (issued as U.S. Pat. No. 5,626,970 on May 6, 1997) for a MAGNETIC RECORDING DISK AND SPUTTERING PROCESS AND APPARATUS FOR PRODUCING SAME, which is a file wrapper continuation of Ser. No. 08/250,521, filed on May 27, 1994 (abandoned), which is a division of U.S. Ser. No. 07/822,589, filed on Jan. 17, 1992, (issued as U.S. Pat. No. 5,316,864 on May 31, 1994), which is a division of U.S. Ser. No. 07/464,339, filed on Jan. 12, 1990 (issued as U.S. Pat. No. 5,082,747 on Jan. 21, 1992), which is a division of U.S. Ser. No. 07/210,119, filed on Jun. 22, 1988 (issued as U.S. Pat. No. 4,894,133 on Jan. 16, 1990), which is a division of U.S. Ser. No. 06/926,676, filed on Nov. 3, 1986 (abandoned), which is a division of U.S. Ser. No. 06/796,768, filed on Nov. 12, 1985 (issued as U.S. Pat. No. 4,735,840 on Apr. 5, 1988.

BACKGROUND OF THE INVENTION

1. Field of the Invention

This invention relates to an apparatus and a method of depositing magnetic thin films used for the magnetic recording media in a mass production, direct current sputtering process and an improved magnetic recording disk product thereby.

2. Description of the Prior Art

The magnetic films that have been used in recording disk and tape systems have been usually particulate in nature, the magnetic particles being embedded in a binder material and then applied to the substrate. Recently, sputtered and evaporated thin film media have been investigated and utilized for commercial data storage systems. The advantages of thinness, low defect level, smoothness and high induction are particularly adaptable to high recording densities at the desirable low flying heights of the head pieces. To provide high density recording it has been recognized that the thin films should exhibit high magnetization, high coercivity, and a square hysteresis loop. Examples of thin film material have included cobalt nickel thin films that have been deposited upon sublayer films of gold to epitaxially orientate the "C" axis of the cobalt/nickel in the plane of the film.

There have been other suggestions to evaporate cobalt films onto a chromium sublayer to increase the coercivity of the cobalt film. Chromium/cobalt deposit film structures have also been suggested using RF diode sputtering. The chromium layer serves as a nucleating layer to provide nucleating centers around which a subsequent magnetic film may grow. Thus, the layer of nucleating material serves to form small agglomerations that are evenly dispersed over the surface of an insulating substrate.

Substrates of glass or aluminum alloys have been suggested for subsequently receiving sputtered deposited layers of chromium cobalt, such as set forth in the article "Sputtered Multi-Layer Films for Digital Magnetic Recording" by Maloney, IEEE Transactions on Magnetics, Volume MAG-15, 3, July 1979. Examples of cobalt nickel magnetic thin films are suggested in the article "Effect of Ion Bombardment During Deposition on Magnetic Film Properties" by L. F. Herte et al., Journal of the Vacuum Society Technology, Volume 18, No. 2, March 1981.

Finally, the use of a protective layer of carbon in a cobalt chromium structure is suggested in "The Optimization of Sputtered Co—Cr Layered Medium for Maximum Aerial Density" by W. T. Maloney, IEEE Transaction Magnetics Volume Mag-17, No. 6, November 1981. The prior art has recognized the importance of reducing the head-gap, the flying height and the medium thickness but to date has not suggested a realization of a low cost commercial process of producing improved magnetic film disks on a production basis to realize the theoretical advantages of certain research results. Thus, there is still a need to improve both the apparatus and process of producing and the characteristics of thin magnetic film disks for commercial utilization.

SUMMARY OF THE INVENTION

The present invention provides a continuous production from a direct current planar magnetron sputtering apparatus for the mass production of magnetic thin film memory disks, a process for using the same and a resulting improved magnetic thin film memory disk resulting from the process.

The apparatus includes a series of pressure reducing entry and exit locks that are positioned before and respectively after a series of main coating chambers. The main coating chambers employ planar magnetron sputtering sources located on either side of the travel path of the disk to be coated. A carrier is designed to position a plurality of disk substrates in a vertical plane for movement through the substrate transport system. Prior to loading on the carrier member, the substrates are pretreated by an abrasion process to provide circumferential texturing, e.g. concentric grooves that enhance the magnetic orientation in the plane of the disk. The substrates are mounted on the vertical substrate carrier and then subsequently heated, for example, to a temperature of about 100° C. The carrier with the substrates passes through an entrance lock slit valve and the initial pressure is reduced first by a mechanical pump, then by a cryogenic pump. The carrier then passes into a subsequent preliminary coating chamber where a second pumping system reduces the pressure to enable a sputtering operation.

An inert gas is utilized to provide the plasma gas and can be selected from one of argon and krypton. A relatively high inert gas pressure is purposely introduced into the main coating chambers to destroy any anisotropy of coercivity that could occur resulting from the angle of incidence of the sputtered material as the carrier with the substrate disk approaches and egresses from rectangular planar sputtering sources. The higher gas pressure increases the incidence of collisional scattering. The substrate carrier enters the first coating chamber and passes between a pair of elongated direct current planar magnetron sputtering sources positioned on either side of the path of travel of the substrate. These sources provide a nucleating layer on both sides of the disk substrate and the material can be selected from chromium or titanium. The nucleating layer favors the epitaxial formation of the subsequent magnetic thin film layer on top of the nucleating layer. The substrate carrier then passes into a second coating chamber having a second pair of elongated direct current planar magnetron sputtering sources of a magnetic layer material again on either side of the path of travel of the substrate carrier. The magnetic layer can be cobalt or preferably a cobalt alloy, such as cobalt/nickel. The substrate carrier then passes into the final coating chamber past a third pair of elongated direct current planar magnetron sources of a protective coating material that is positioned on either side of the path of travel of the substrate carrier. The protective coating material is sputtered on top of the thin magnetic film layer to improve both the wear characteristics and to protect against corrosion. Various forms of protective overcoatings can be utilized, the preferred form being carbon. The coated memory disk is then removed from the production line without affecting the sputtering operation pressure range through the egressing locks. The disks are then subsequently tested for quality control and are ready for shipping to a customer.

The improved memory disk of the present invention comprises a substrate coated with chromium with preferably a layer of cobalt/nickel as the magnetic layer sealed with a protective coating of carbon. As a result of this circumferential texturing, a circular anisotropic crystal growth has occurred during the sputtering with a circumferential alignment that provides an improved memory disk having a reduced amplitude modulation, an improved squareness of the hysteresis loop, e.g. lower switching field distribution and a high production relatively low cost production system. As a result, a higher recording linear bit density due to the high coercivity and low switching field distribution can be experienced with the magnetic disk of the present invention.

The features of the present invention which are believed to be novel are set forth with particularity in the appended claims. The present invention, both as to its organization and manner of operation, together with further objects and advantages thereof, may best be understood by reference of the following description, taken in conjunction with the accompanying drawings.

DESCRIPTION OF THE PREFERRED EMBODIMENTS

Figure 1:
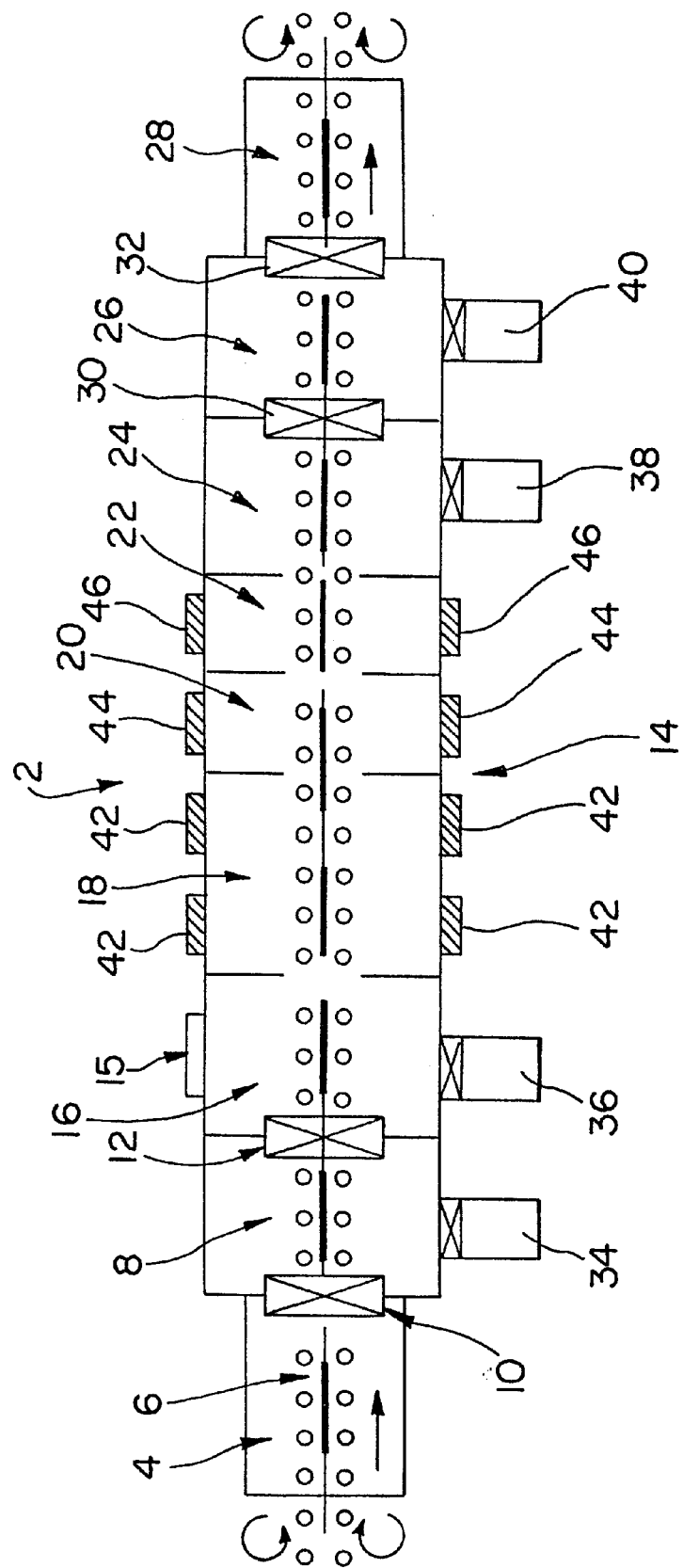
FIG. 1 is a schematic illustration of a direct current planar magnetron sputtering process line.
Figure 2:
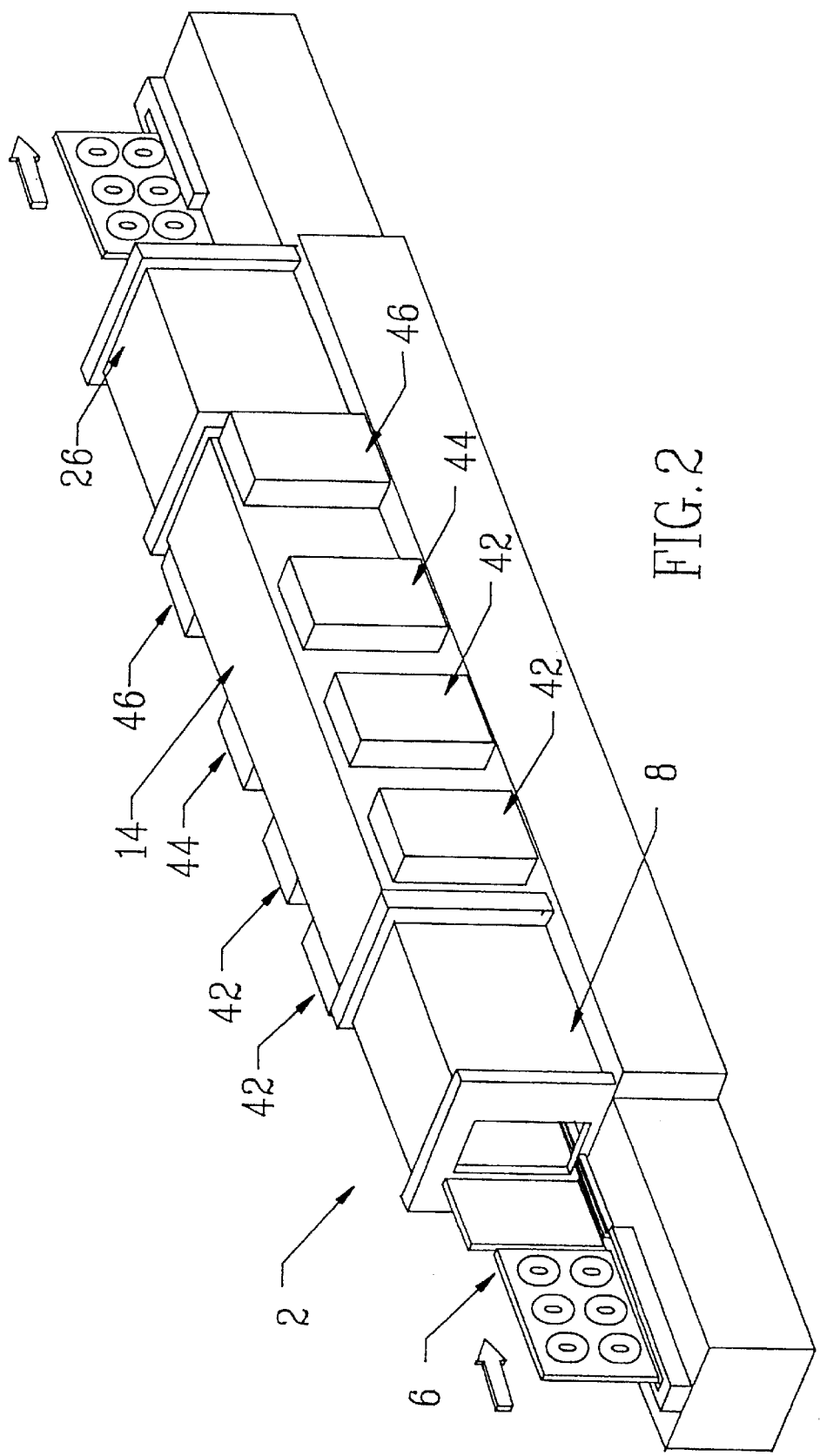
FIG. 2 is a schematic perspective view of the production line.

The following description is provided to enable any person skilled in the thin film deposition art to make and use the invention and sets forth the best modes contemplated by the inventor of carrying out his invention. Various modifications, however, will remain readily apparent to those skilled in these arts, since the generic principles of the present invention have been defined herein specifically to provide a relatively economical process for manufacturing thin film magnetic disks of an improved structure on a production basis. Referring to FIGS. 1 and 2, a direct current planar magnetron sputtering production assembly line 2 is shown and comprises from left to right a loading table 4 for receiving a disk carrier 6, an entrance lock chamber 8 having an outer entrance lock 10 and an inner entrance lock 12.

The main deposition chamber 14 is subdivided into a preliminary chamber 16 and sputtering chambers 18, 20 and 22, respectively. An exit chamber 24 is the final chamber of the main deposition chamber 14 and is positioned before the exit lock chamber 26. Finally, an unload table 28 is provided along the production line.

As can be seen, the disk carrier 6, which is a flat multi-operational metal support plate, is transported through a series of rollers in a uni-directional travel from the load table 4 to the unload table 28. An inner lock valve 30 and an exit lock valve 32 are positioned on either side of the exit lock chamber 26. The main deposition chamber 14 includes a series of partition walls having central apertures for dividing the respective sputtering chambers. A rotary mechanical pump (not shown) is used to lower the pressure in the entrance lock chamber 8 to a pressure of about $0.5 \times 10^{-2}$ torr. Subsequently, a cryogenic pump continues to lower the pressure to $2 \times 10^{-5}$ torr, prior to the entrance lock chamber 8 being back-filled with relatively pure argon (99.99%) at a pressure of $2 \times 10^{-2}$ torr. The entrance lock chamber pump 34 is complemented with a pair of main deposition chamber pumps 36 and 38. Finally, an exit lock chamber pump 40 is provided to evacuate the exit lock chamber 26.

The disk carrier 6 is particularly designed to be maintained in a vertical plane as it passes through the main desposition chamber 14. The first sputtering chamber 18 is provided with four direct current planar magnetron sputtering sources 42 for providing a nucleating layer. The sources 42 are approximately five inches wide by fifteen inches in length and are approximately ⅜ of an inch thick with direct water cooling. The main deposition chamber 14 is also filled with argon at a pressure of $2 \times 10^{-2}$ torr. This pressure range is relatively high for a DC planar magnetron sputtering system since it is usually preferable to operate at a much lower pressure to maximize the deposition rate of the target material. The use of the relatively high pressure of argon gas for a DC planar magnetron sputtering procedure is specifically to prevent direct collision of the ions with the substrate disk at low angles of incidence as the disk carrier 6 progressively moves through the assembly line 2. Usually the speed of the substrate transport system for the disk carrier 6 is a velocity within a range of 1 to 10 mm/sec, with a typical average speed of 3 mm/sec.

The next sputtering chamber 20 provides the magnetic layer and includes two magnetron sputtering sources 44 positioned on either side of the line of travel of the disk carrier 6. The target dimensions are approximately the same as the nucleating targets 42 and can, for example, be cobalt/nickel alloy source 44. Finally, sputtering chamber 22 includes a protective coating source 46, such as carbon, that again comprises a pair of sources one on each side of the line of travel of the disk carrier 6. Each of the sources are essentially line sources with cosine distribution of their emission profile. The target spacing for an opposing pair is 5½ inches with a target to substrate spacing of approximately 2¼ inches preferred. The target source to substrate distance is preferably maintained within a range of 2 to 4 inches.

The direct current planar magnetron sources 42, 44 and 46 can use both permanent magnets or electro magnets for plasma confinement. Each source is independently powered by constant current 10 kw direct power supply.

Figure 3:
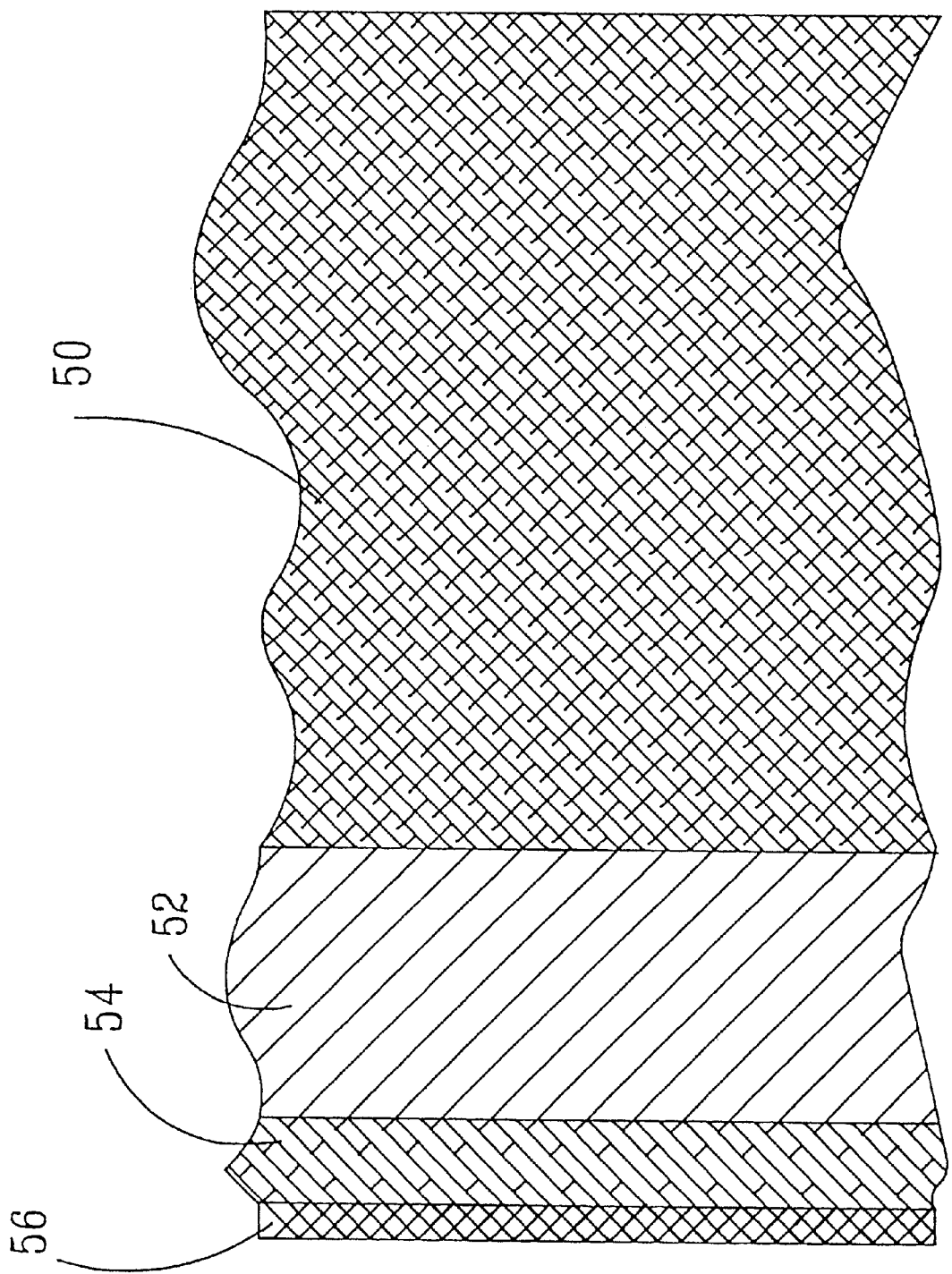
FIG. 3 is a cross-sectional diagram of a magnetic film recording disk of the present invention.

Referring to FIG. 3, a substrate 50 can be selected from glass, an electroless plated nickel over aluminum alloy where the aluminum alloy is 5086, pure aluminum or a polycarbonate or a polyetheramide plastic. The substrate dimensions can be in the range of 95 mm to 230 mm in outer diameter with a thickness of 0.035 to 0.080 inches. The arithmetic average of the substrate smoothness should be about 75 to 100 angstroms. The nucleating layer 52 can be selected from chromium and titanium. Preferably, chromium is selected in the preferred embodiment.

Figure 11:
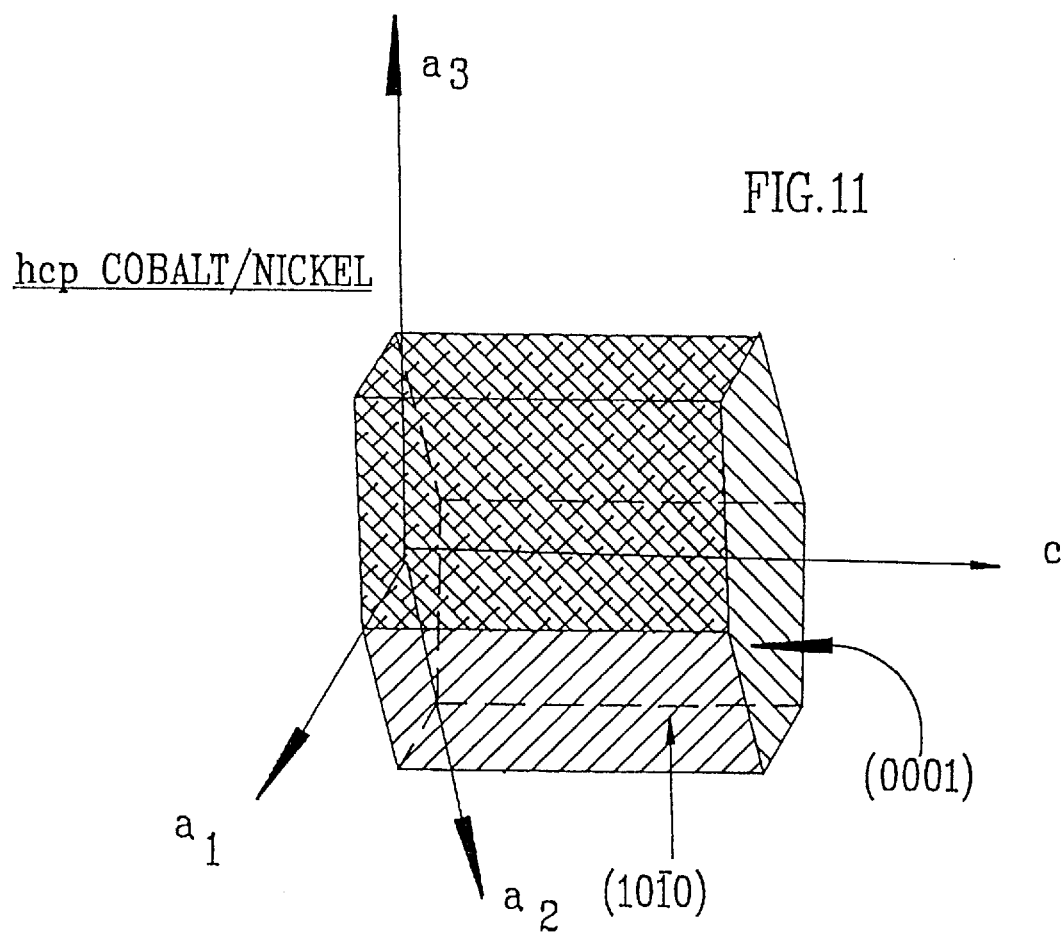
FIG. 11 is a perspective view of a cobalt nickel crystal structure.
Figure 12:
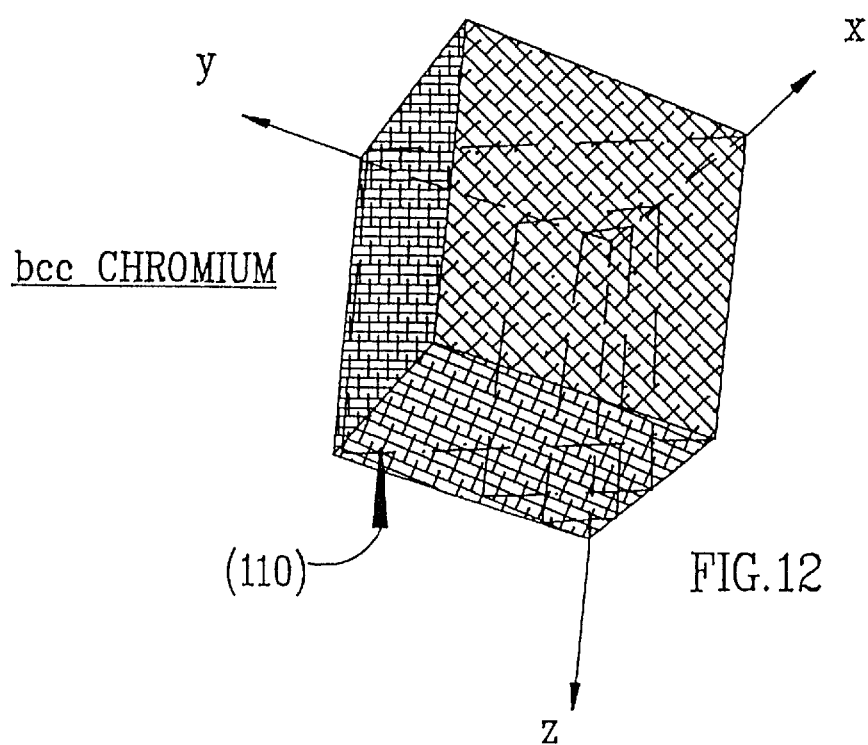
FIG. 12 is a perspective view of a chromium crystal structure.

As shown in FIG. 12, the chromium underlayer 52 provides a BCC (body centered cubic) structure with a (110) orientation of its crystalographic plane parallel to the plane of the substrate disk 50. This (110) orientation provides the appropriate lattice parameter to initiate the epitaxial growth in the magnetic thin film layer of a HCP (hexagonal close packed) phase with a (1010) orientation that is the "C" axis, which is perpendicular to the (0001) plane, is parallel to the substrate 50. Reference can be had to FIG. 11 to show such an orientation of a cobalt/nickel alloy. As can be appreciated by these skilled in this field, it is highly desirable to have the hexagonal close pack phase (HCP) of the magnetic thin film layer orientated parallel to the plane of the disk for longitudinal recording. Generally, the depositing of the magnetic film material, such as the cobalt/nickel film, directly on a glass or aluminum substrate will obtain a FCC (Face Center Cubic) structure. However, the use of a nucleating layer will provide the preferred orientation.

The thickness of the nucleating layer of chromium is within a range of 1000 to 5000 angstroms. A preferred thickness for the nucleating layer can be approximately 3000 angstroms of chromium. The magnetic layer 54 can be selected from one of cobalt, a cobalt/nickel alloy, a cobalt/chromium alloy and a cobalt/vanadium alloy. In the cobalt/nickel alloys a range of 0 to 35% nickel and 65% to 100% cobalt could be utilized while in the cobalt/chromium alloys a range of 5 to 25% chromium could be utilized, and in the cobalt/vanadium alloys a 5 to 25% range of vanadium could be utilized. The thickness of the magnetic layer is approximately 200 to 1200 angstroms and is preferably in the range of approximate 750 angstroms.

Finally, a protective overcoat 56 is provided for wear resistance and corrosion resistance. It is believed that titanium carbide, boron carbide and tungsten carbide could be utilized. The preferred protective overcoating is carbon having a layer thickness in the range of 200 to 800 angstroms with 300 angstroms being an approximate preferred coating thickness.

To achieve a high volume production with a continuous on-line sputtering process, disk carriers 6 are progressively moved through apertures in each of the sputtering chambers 18, 20 and 22. The purpose of providing a nucleating layer 52 is to permit a "C" axis texture to be formed in the subsequent magnetic layer 54 in a random manner. A problem has occurred, however, in that an anisotropic "C" axis texture is promoted by an early arrival of chromium atoms as the substrate enters through the aperture of the chamber 18 and the very large angle of incidence resulting from the movement of the substrates during the constant sputtering process. This anisotropy of the "C" axis causes an anisotropy of coercivity which will produce a severe once around amplitude modulation in an output signal recorded on the magnetic layer 52. This is a particularly objectionable property for a high density longitudinal recording. This problem is graphically disclosed in FIG. 4 wherein a plus or minus 25% amplitude modulation has been experienced.

Figure 6:
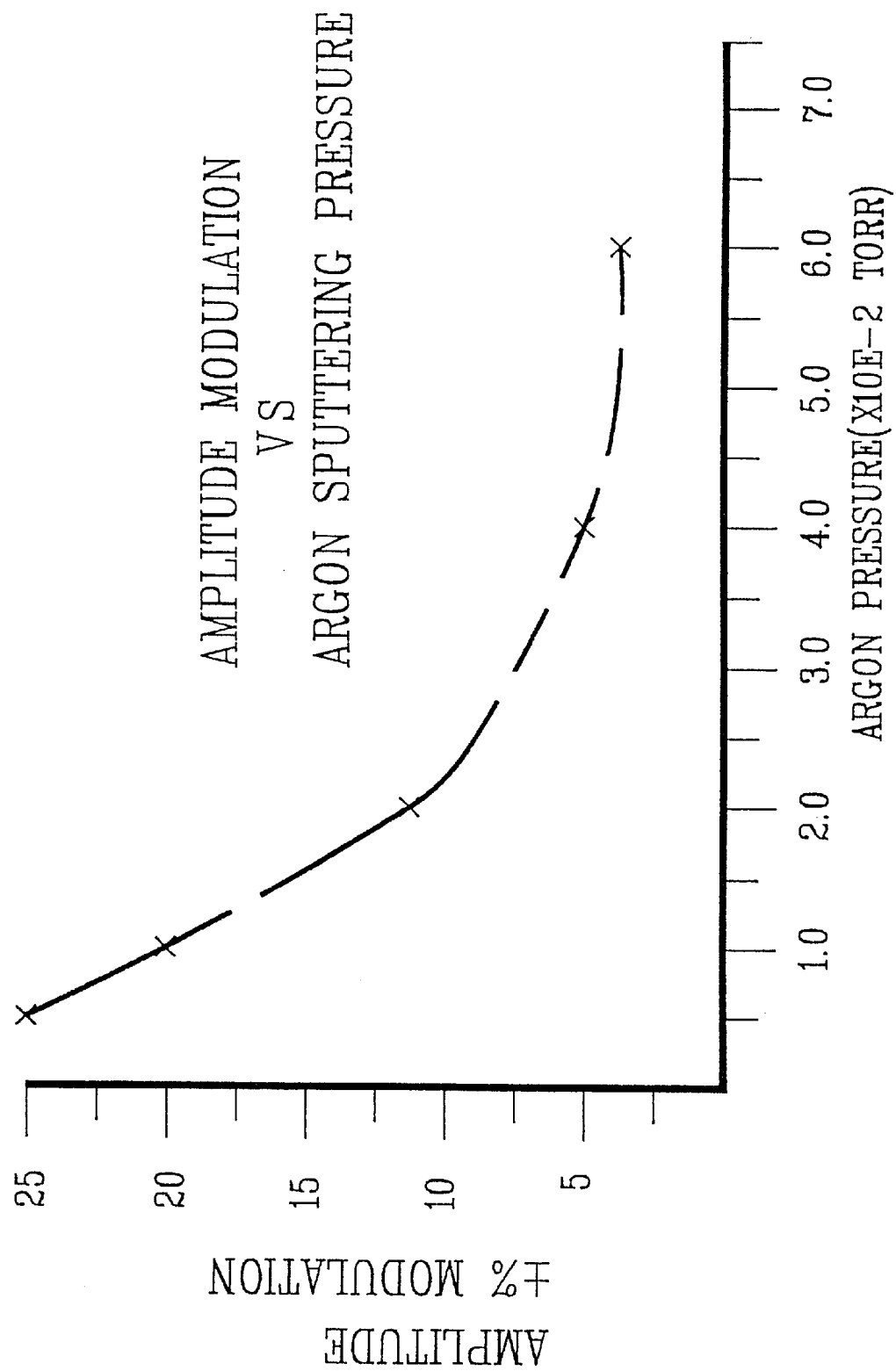
FIG. 6 is a graph of amplitude modulation versus argon sputtering pressure.

The present invention by providing a relatively high argon pressure relative to a direct current planar magnetron sputtering process, removes this problem of anisotropic orientation by providing a random distribution of the sputtered atoms (presumably resulting from a collisional phenomena with the argon atoms at the relatively high pressure). Referring specifically to FIG. 6, the relationship between the amplitude modulation of the read/back voltage and the argon sputtering pressure is graphically disclosed. As can be seen from this graph, higher pressure reduced the modulation while lower pressures would increase the modulation.

Figure 7:
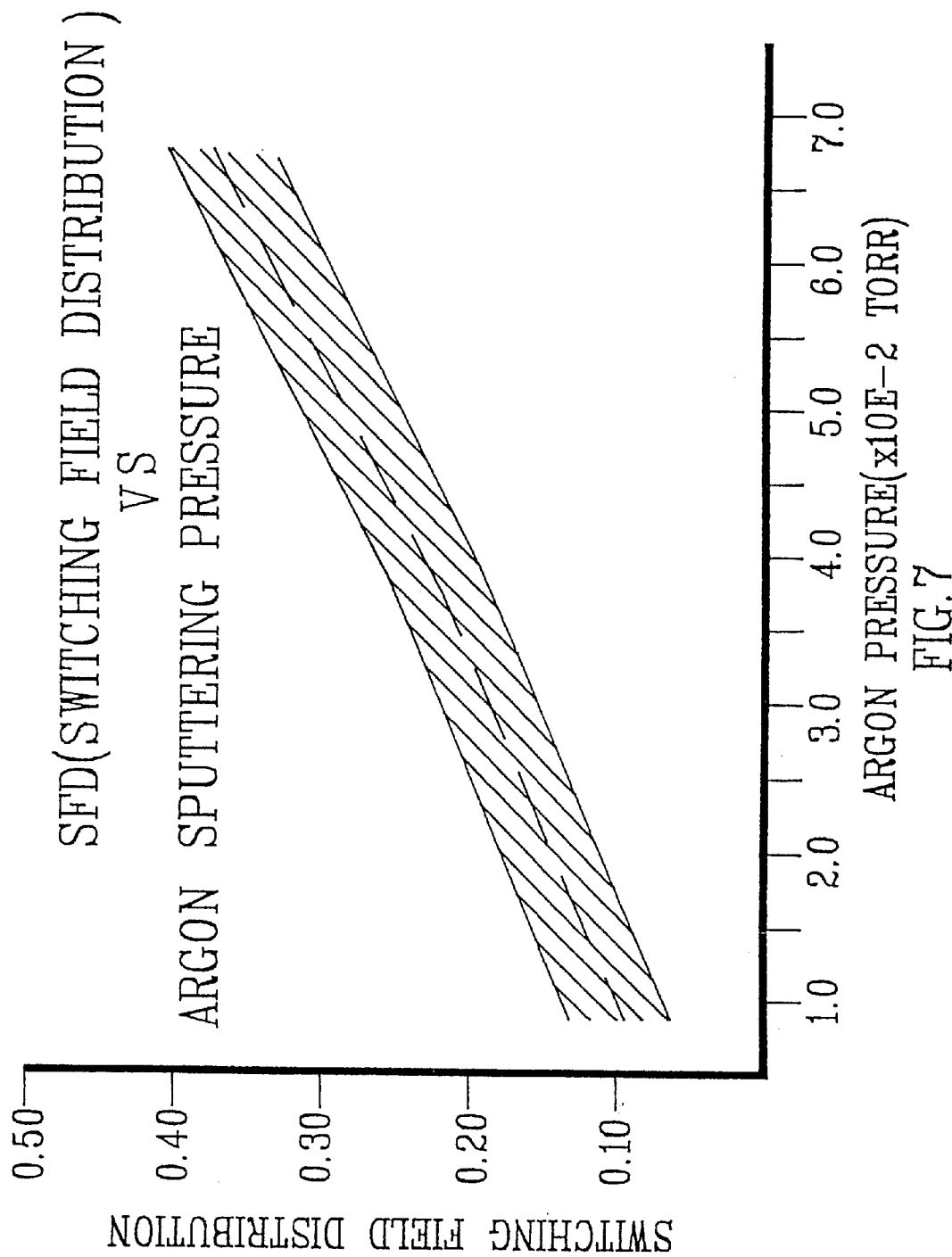
FIG. 7 is a graph of switching field distribution versus argon sputtering pressure.

Referring to FIG. 7, the relationship to switching field distribution (SFD) is disclosed for the magnetic layer as it varies with the argon sputtering pressures. The SFD at lower pressures is correspondingly low, and at the higher pressures the SFD value is high. It is believed that this occurs because the larger and more uniform grain size is promoted at lower pressures and more variant grain sizes are promoted at higher pressures.

A lower SFD value, typically below 0.20 is particularly advantageous for high density magnetic recording since such values allow a high resolution of the recording bit transitions. By comparing FIGS. 6 and 7, it can be seen that the low argon pressures have an advantage with regard to the SFD value but provide a disadvantage with regard to amplitude modulation. Thus, a design factor in the present invention is a compromise in providing an argon pressure such as a range of 2.0 to $4.0 \times 10^{-2}$ torr. In operation, the present invention could utilize a plasma gas pressure range from $1 \times 10^{-2}$ torr. Operation below $1 \times 10^{-2}$ torr can increase the amplitude modulation by a ±15% operation above $7.5 \times 10^{-2}$ torr permits the columnar structure of the thin film to become too porous and rough for permitting the recording head to fly close to the disk surface. As those skilled in the art know, the closer the recording head can fly to the recording disk, the more efficient will be the read and write recording. Recording heads typically fly above the surface of the disk, supported by an air cushion at a distance of 6 to 12 micro inches. Irregularities on the surface of the recording disk that could interfere or contact the recording head must be avoided.

Figure 4:
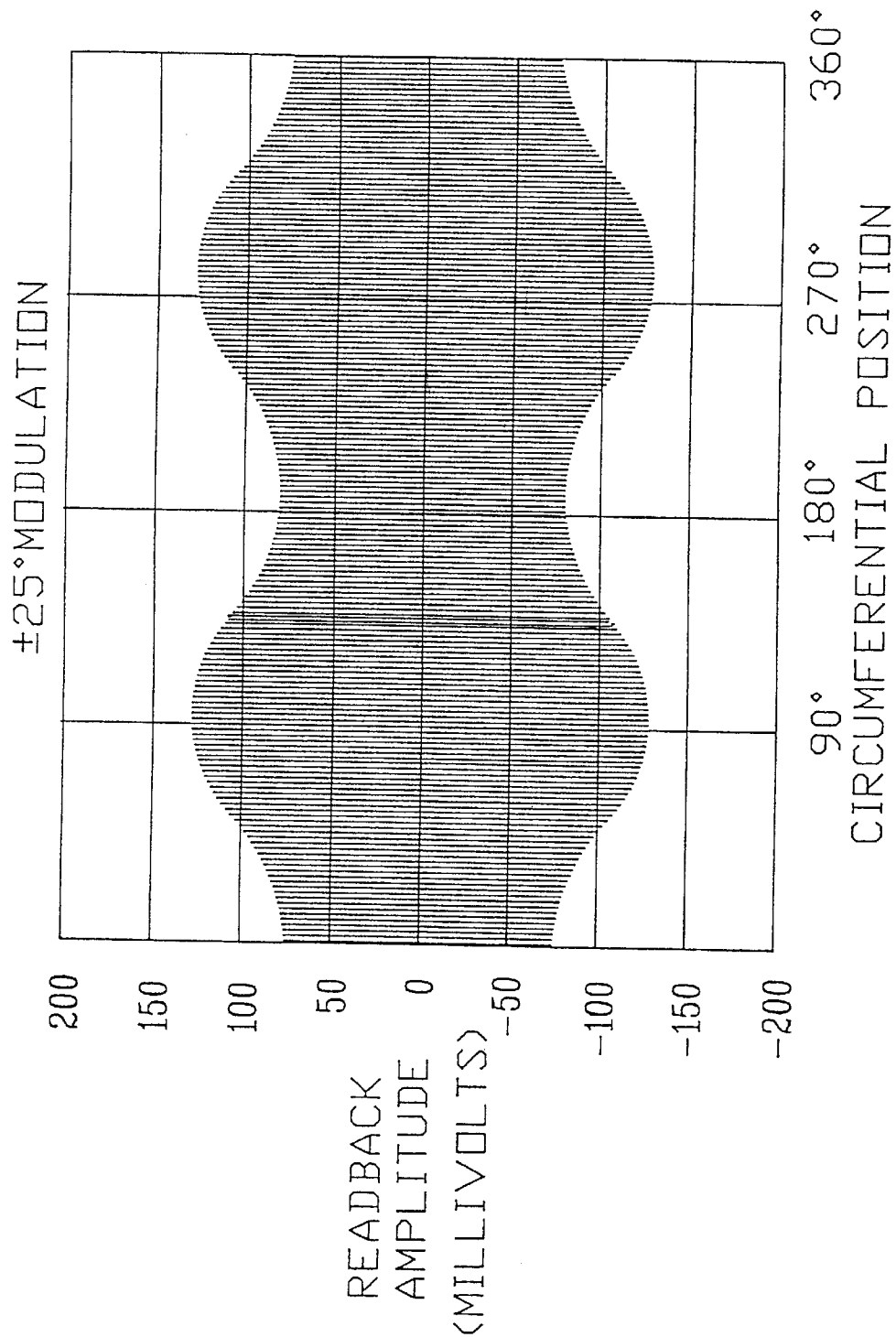
FIG. 4 is a graph of a one revolution read/back voltage envelope showing amplitude modulation characteristics of a recording disk as a result of sputtering at a low argon pressure.
Figure 5:
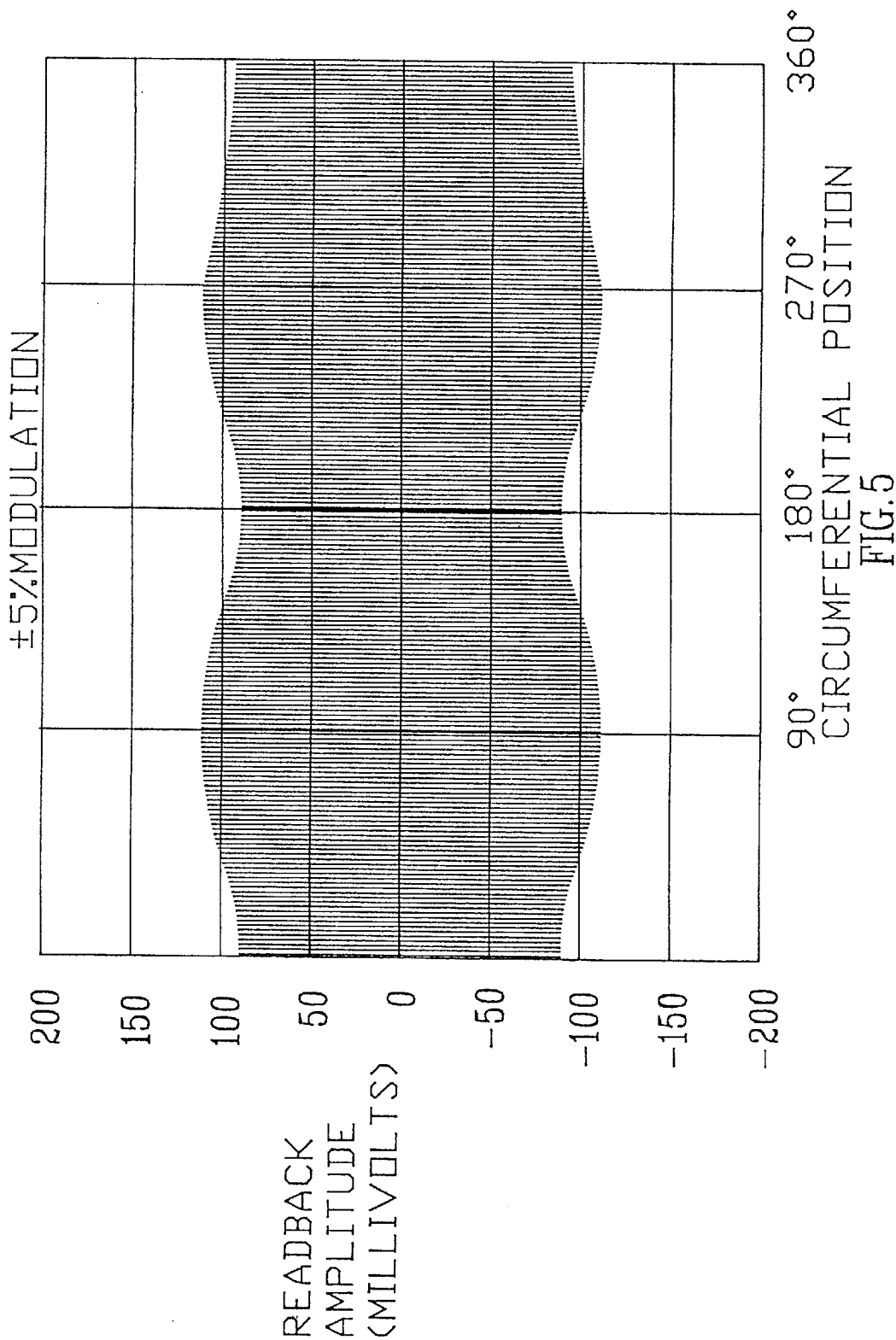
FIG. 5 is a one revolution read back voltage envelope showing amplitude modulation characteristics as a result of the sputtering process being conducted in a high pressure argon gas.

FIG. 4 and FIG. 5 are representations of oscilloscope voltage traces for one revolution of travel around a disk circumference while sending the read/back signal from a high frequency 2 F MFM written pattern. FIG. 4 shows the read/back voltage modulated by ±25% which is an unacceptable value for present day magnetic recording read/write channels.

FIG. 5 shows the read/back voltage modulated by ±5% which is a value necessary for the highest performance from a magnetic recording disk device.

The read/back signal amplitude modulation shown in FIG. 4 is caused by anisotropic orientation of the HCP "C" axis of the cobalt/nickel layer shown in FIG. 11. This anisotropic orientation is in the plane of the disk parallel to the direction of traverse passing the sputtering sources due to the sputtering of all layers at lower pressures (typically below $2.0 \times 10^{-2}$ torr) and consequently inducing a low angle of incidence columnar film growth in preference to the direction of the substrate as it passes the sources.

This HCP "C" axis anisotropy causes the resulting film coercivity to have a similar directional anisotropy and consequently causes variations in the read/back signal voltage at varying circumferential positions as the head travels around the disk in one revolution.

FIG. 5 shows a reduced modulation amplitude of the read/back voltage signal due to a sputtering operation at higher pressures (typically $2.0 \times 10^{-2}$ to $4.0 \times 10^{-2}$ torr).

Sputtering at these higher pressures causes collisional scattering of sputtered atoms before they reach the substrate and hence a more random film structure, which includes the random orientation of the HCP "C" axis of the cobalt/nickel layer in the plane of the disk, thereby eliminating any low angle of incident effects.

Figure 13:
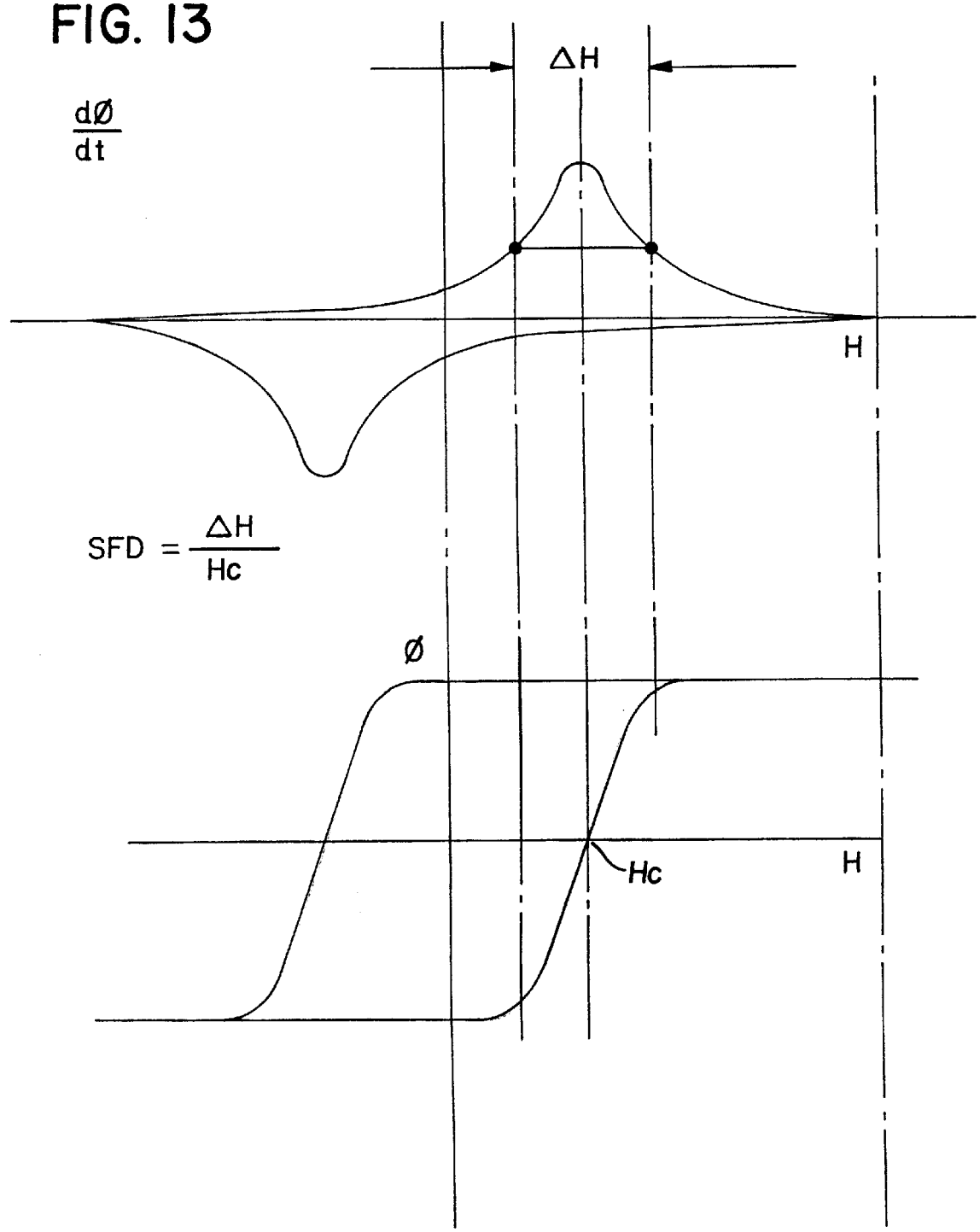
FIG. 13 is a combined graph of the hysteresis loop and the relationship of switching field distribution.

To improve the magnetic recording density, it is important to provide a relatively high squareness to the hysteresis loop as disclosed in FIG. 13. The randomizing of the "C" axis by the increased gas pressure of the present invention lowers the amplitude modulation but only provides a modest squareness to the hysteresis loop.

Figure 9:
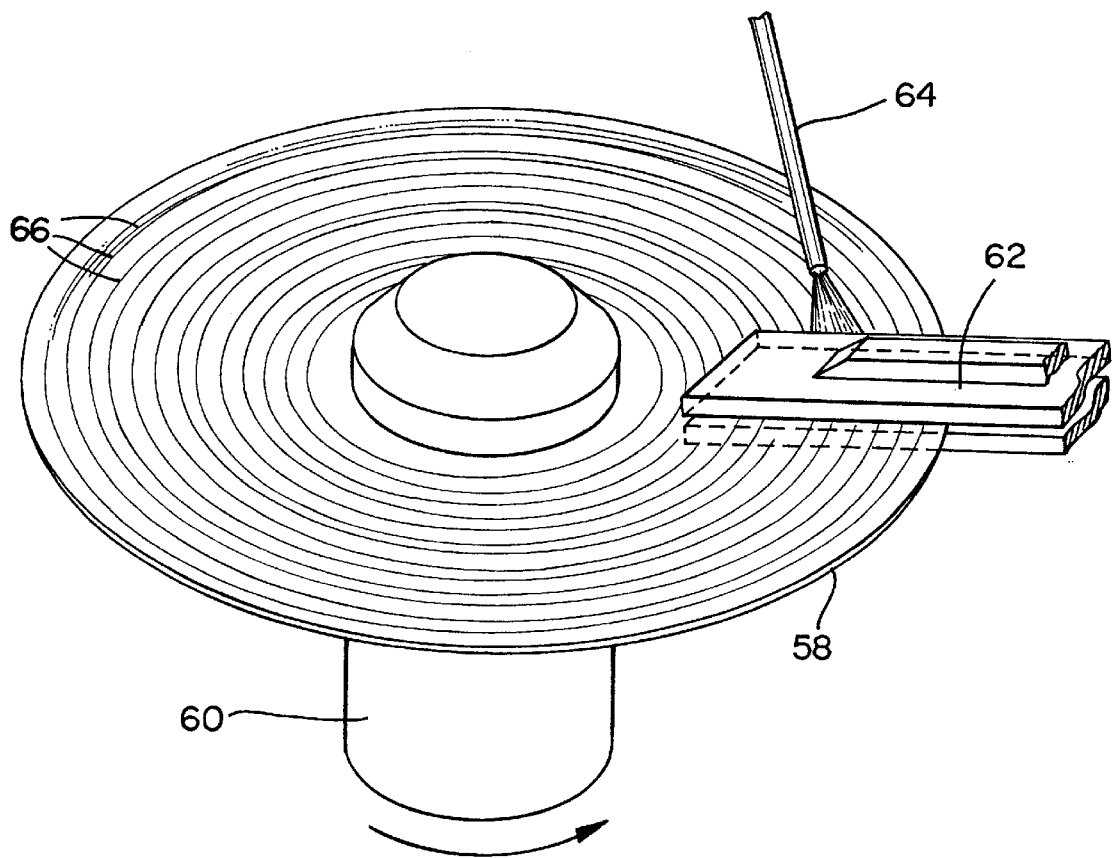
FIG. 9 is a schematic illustration of process for applying circumferential texturing to a disk substrate.

The present invention has discovered that circumferential texturing or abrading of the disk surface can cause the "C" axis to orientate in a circumferential direction and thereby supply a more intense uniform continuous read/back signal to the flying head with a resulting very square hysteresis loop. Thus, a preliminary abrading of the substrate as shown in FIG. 9 is an advantage of the present invention. As mentioned earlier, one of the design goals in this art is to permit the recording head to fly as close as possible to the surface of the recording disk. The abrading step on the substrate would appear to be contrary to this teaching. In fact, excessive roughness to the substrate will provide a limitation to the closeness by which the head can fly to the finished recording disk.

In FIG. 9, a substrate 58, such as a nickel plated aluminum member is positioned on a rotating shaft 60 and rotated at a speed less than 200 rpm. A diamond impregnated polyester tape 62 is applied to both sides of the disk substrate 58 to abrasively remove the nickel plating from the substrate in the shape of concentric grooves 66 roughly proportional to the size of the diamond abrasive in the tape. Generally, the particle size of the abrasive is typically in the range of 0.1 to 1.0 microns. This circumferential texturing can be accomplished by rotating the substrate 58 while pressing the diamond impregnated polyester tape 62 against both sides of the disk in the presence of a fluid coolant, like kerosene, supplied through a nozzle 64. The coolant not only controls the temperature of the abrading process but also acts to remove any microscopic abraded debris.

Figure 8:
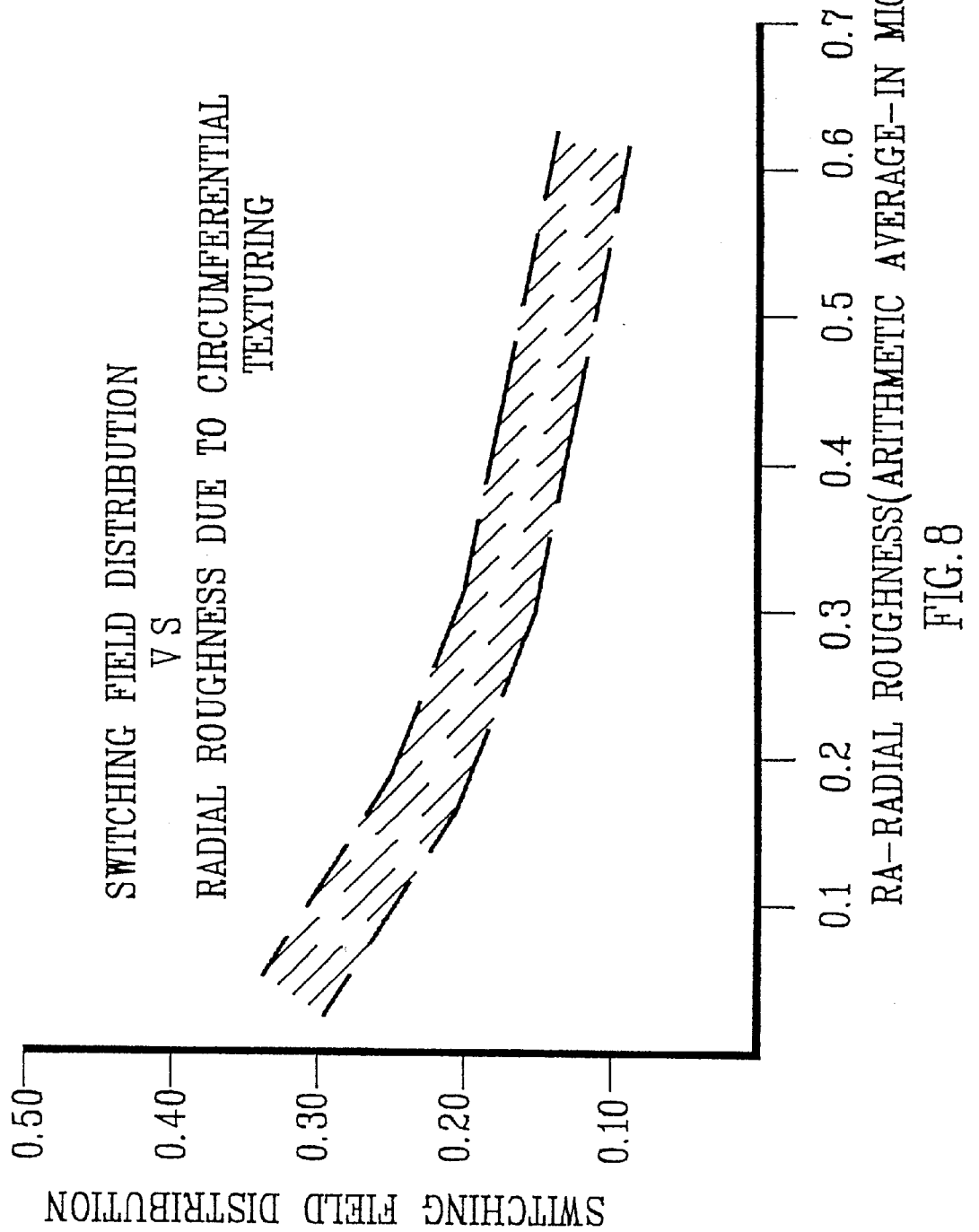
FIG. 8 is a graph of switching field distribution versus radial roughness.

Referring to FIG. 8, the relationship between the switching field distribution (SFD) and the radial roughness of the finished disk due to circumferential texturing is disclosed. As the disk surface radial roughness increases due to a deliberate circumferential grooving the SFD decreases. A low SFD is a desirable parameter for high density recording. It is believed that the physical cause of this effect is the preferential orientation of the "C"-axis of the HCP phase of, for example, a cobalt/nickel magnetic layer along a circumferential textural line. It is also believed that this occurs primarily due to any shadowing effects of the hills and valleys of the texturing. The roughness factor should be in the range of 50 to 500 angstroms. A roughness factor below 50 angstroms promotes higher switching field distribution and permits a more random "C" axis orientation. A roughness above 500 angstroms can interfere with the fly chracteristics of the recording head.

Referring again to FIGS. 1 and 2, a substrate disk, such as an electroless plated nickel over aluminum alloy, with the aluminum alloy being 5086 can be circumferentially textured as shown in FIG. 9 to a radial roughness factor of 200 angstroms prior to being loaded on to the disk carrier 6. Usually, the substrates are preparatorily cleaned with deionized water, a detergent of a non-ionic surfactant and ultrasonics (10 to 60 kilohertz). The substrates can also be inserted into a vapor phase of a trichlorotrifluoroethane vapor dryer. The substrate can also be preliminarily heated to 100 degrees Centigrade as an additional preparatory step.

The cleaned and heated substrate can then be loaded onto disk carrier 6 which then subsequently enters the entrance lock chamber 8, and when the outer door is closed the entrance lock chamber can be evacuated by a rotary mechanical pump and then subsequently by a cryogenic pump 34. The lock chamber 8 is filled with argon gas at a pressure of $2 \times 10^{-2}$ torr. The main deposition chamber 14 has been previously evacuated and pumped to a base pressure of $2 \times 10^{-7}$ torr as a result of the two cryogenic pumps 36 and 38. This chamber is also filled with argon gas at a pressure of $2 \times 10^{-2}$ torr. The disk carrier 6 then moves at a constant velocity through the respective sputtering chambers 18 through 22. Power is supplied to all of the sputtering sources, as more particularly seen in FIG. 2 and a plasma is initiated over each source to commence the sputtering. The entrance lock inner door or valve 12 opens and the vertically orientated disk carrier 6 moves forward at a speed of approximately 3 mm/sec. 3 kw of power are supplied to each of the four chromium sources 42 which are utilized for the nucleating layer 52 as shown in FIG. 3. 2.5 kw of power is supplied to each of the two cobalt/nickel layer sources and 2.5 kw is supplied to each of the two carbon protective layer sources. As the disk carrier 6 traverses past each of the deposition sources, they are uniformly coated, first with a nucleating layer 52, then the magnetic layer 54 and finally the protective layer 56. The actual substrate temperature will advantageously be maintained by a heater 15 in a temperature range of 75 degress Centigrade to 250 degrees Centigrade. A temperature below 75 degrees Centigrade will not permit a reliable adhesion of the thin film layers while a temperature above 250 degrees Centigrade can create a warp in the substrate disk and can cause the nickel phosphorous layer to become magnetic. It is believed that this may be caused by the migration of the phosphorous to the grain boundaries at the higher temperature.

Figure 10:
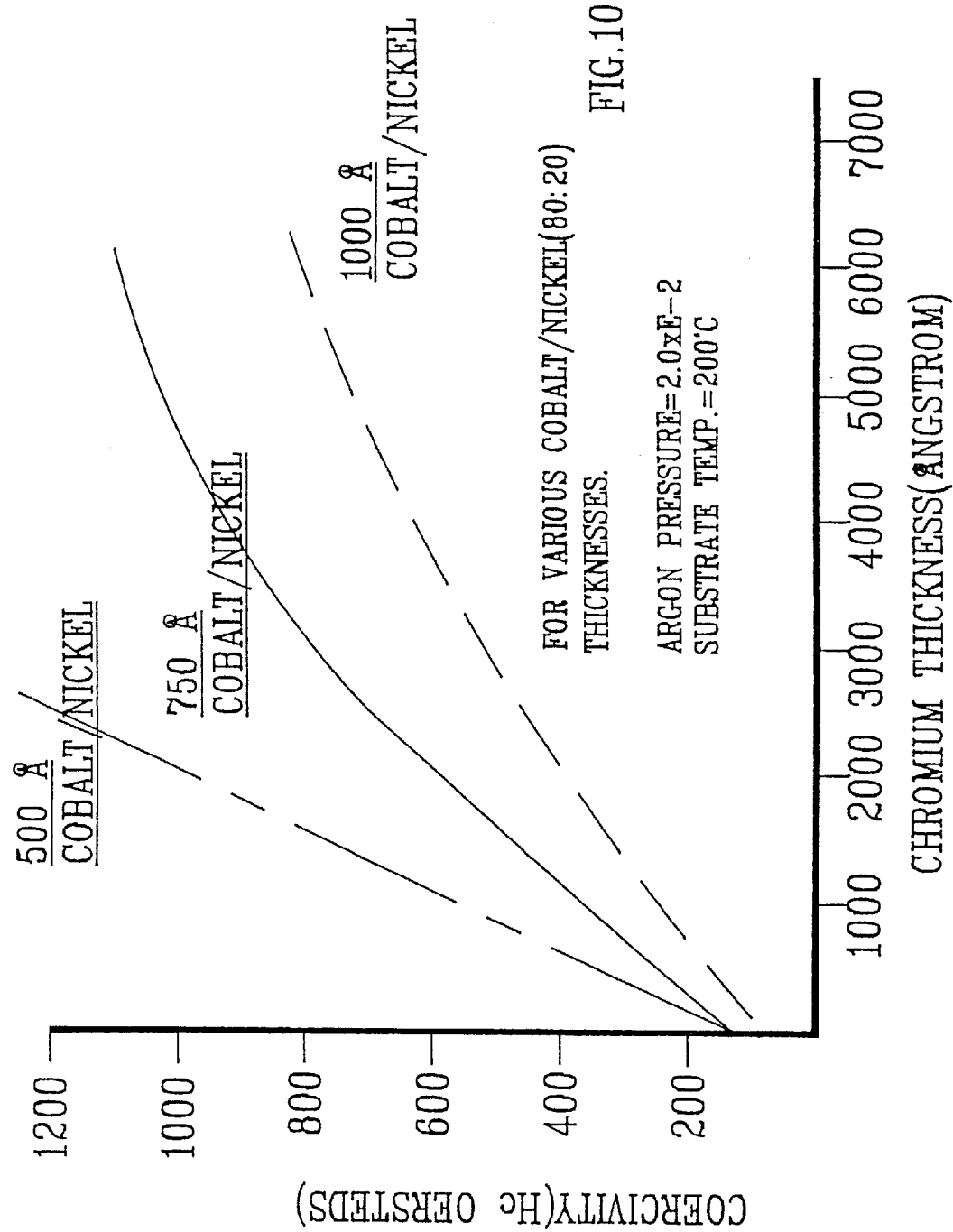
FIG. 10 is a graph of coercivity versus thickness of the chromium layer.

The actual thickness layer of the nucleating layer of chromium is within the range of 1000 to 5000 angstroms, and FIG. 10 discloses a graph of coercivity versus the chromium layer thickness. This graph was derived for a cobalt/nickel 80:20 alloy thickness with an argon pressure of $2 \times 10^{-2}$ torr and a substrate temperature of 200 degrees Centigrade. As can be seen, for a given cobalt/nickel layer thickness coercivity increases with increasing chromium thickness and for a given. chromium thickness coercivity decreases with an increasing cobalt/nickel thickness.

A magnetic layer, such as a cobalt/nickel alloy is deposited within the range of 200 to 1500 angstroms, and finally a protective coating, such as carbon, is deposited within the range of 200 to 800 angstroms. The disk carrier then transports the finished coated magnetic recording disk to the exit lock chamber 26 which has been previously evacuated and pumped to $2 \times 10^{-5}$ torr and then back filled with argon to $2 \times 10^{-2}$ torr. The interlock valve 30 is closed and the exit lock 32 is vented to atmospheric pressure with argon in less than 20 seconds. The disk carrier 6 exits the exit lock 32 and the finished recording disks are unloaded for quality control testing. The empty disk carriers 6 are returned for reloading for a subsequent production cycle.

Referring to FIG. 13, the switching field distribution (SFD) defines a measure of the change in the drive field requirements to switch the magnetic domains of the magnetic layer. Graphically, this parameter is defined by means of an unintegrated or differential curve. By constructing a horizontal line at a vertical coordinate of one half the peak value, two points of the intersection result are defined as the horizontal distance between these points. Delta H is defined as the horizontal distance between these points. SFD is defined as divided by the coercivity Hc. Hc is shown at the width of the hysteresis loop shown at the bottom of the graph of FIG. 13.

While the above features of the present invention teach apparatus, process and an improved magnetic recording disk, it can be readily appreciated that it would be possible to deviate from the above embodiments of the present invention and, as will be readily understood by those skilled in the art, the invention is capable of many modifications and improvements within the scope and spirit thereof. Accordingly, it will be understood that the invention is not to be limited by the specific embodiments but only by the spirit and scope of the appended claims.

I claim:

1. A magnetron sputtering production process for producing magnetic thin film memory disks from circumferentially textured substrates with coatings on both sides of the disk and a circumferential orientation of coercivity, comprising:

texturing a substrate with grooves in the circumferential direction;

mounting a cleaned substrate in an approximately vertical plane;

providing a transportation of the vertically mounted substrate through a sequential series of sputtering processing steps at a series of separate sputtering stations;

reducing the pressure to enable a sputtering operation at each sputtering station;

providing a gas in a plasma state at each separate sputtering station;

heating the vertically mounted substrate to a temperature within an approximate temperature range of 75° C. to 250° C.;

sputtering a thin film nucleating layer above the substrate using magnetron sputtering sources of a nucleating layer material, by bombarding the nucleating sources with ions from a plasma gas to deposit a nucleating layer on both sides of the substrate, without substantial oxidation of a nucleating surface, for epitaxial growth of a subsequent magnetic layer;

sputtering a thin film magnetic layer above the nucleating layer, including magnetron sources to deposit a magnetic layer on both sides of the substrate by bombarding the magnetic layer magnetron sources, whereby a coating process on both sides of a substrate is performed with a hexagonal close-packed cobalt alloy deposited above the nucleating layer with a circumferential orientation of coercivity; and sputtering a thin film protective layer above the magnetic layer, including magnetron sputtering sources to deposit a protective layer on both sides of the substrate, by bombarding the protective layer sources to deposit a protective layer on both sides of the substrate.

2. The magnetron sputtering production process of claim 1 further including maintaining the vertically mounted substrate at a temperature of approximately 75° C. to approximately 250° C. during the sputtering of the nucleating layer and the magnetic layer.

3. The magnetron sputtering production process of claim 1 further including maintaining the vertically mounted substrate at a temperature of approximately 200° C. during the sputtering of the nucleating layer and the magnetic layer.

4. The magnetron sputtering production process of claim 1 wherein the substrate is aluminum with a nickel phosphorus surface layer.

5. The magnetron sputtering production process of claim 4 wherein the disk has a magnetic switching field distribution of less than 0.20.

6. The magnetron sputtering production process of claim 4 wherein the nucleating layer includes chromium.

7. The magnetron sputtering production process of claim 6 wherein the cobalt alloy includes nickel.

8. The magnetron sputtering production process of claim 4 wherein the sputtered magnetic layer has C-axes and a preferred orientation of the C-axes parallel to the surface of the magnetic layer.

9. A magnetron sputtering process for producing magnetic thin film memory disks from circumferentially textured substrates with coatings on both sides of the disks and a circumferential orientation of coercivity, comprising:

receiving substrates textured in the circumferential direction;

preheating the substrates;

transporting the substrates, vertically mounted, through a sequential series of sputtering processing steps;

reducing an initial pressure to a reduced pressure level within a pressure range to enable a sputtering operation;

providing a gas in a plasma state at each separate sputtering station;

sputtering a thin film nucleating layer above the substrates including providing nucleating layer magnetron sputtering sources and bombarding the nucleating layer magnetron sputtering sources with ions from the plasma gas to deposit a nucleating layer on both sides of the substrates without substantial oxidation but with a predetermined epitaxial growth of a subsequent magnetic layer;

sputtering thin film magnetic layer comprising a hexagonal close-packed cobalt alloy with a circumferential anisotropic orientation of coercivity above the nucleating layer, including providing magnetic layer magnetron sputtering sources on both sides of the substrates at a position separate from the nucleating layer magnetron sputtering sources and bombarding the magnetic layer magnetron sputtering sources, whereby a coating process on both sides of the substrates is performed; and sputtering a thin film protective layer above the magnetic layer, including providing protective layer magnetron sputtering sources on both sides of the substrates at a position separate from the magnetic layer magnetron sputtering sources, and bombarding the protective layer magnetron sputtering sources with ions from the plasma gas to deposit a protective layer on both sides of the substrates.

10. The magnetron sputtering process of claim 9 wherein the thin film nucleating layer comprises a body centered cubic material.

11. The magnetron sputtering process of claim 10 wherein the thin film nucleating layer contains chromium.

12. The magnetron sputtering process of claim 10 wherein the magnetic layer comprises a hexagonal close-packed cobalt alloy with C-axes, and wherein the magnetic layer has a preferred orientation of C-axes parallel to the surface of the magnetic layer and an epitaxial relationship with the nucleating layer.

13. The magnetron sputtering process of claim 12 wherein the magnetic layer has a majority of C-axes parallel to the surface of the thin film magnetic layer.

14. The magnetron sputtering process of claim 12 wherein the substrate has a non-magnetic surface layer which contains nickel phosphorous.

15. The magnetron sputtering process of claim 14 wherein the substrate is nickel phosphorous plated aluminum.

16. The magnetron sputtering process of claim 12 wherein the substrates are heated to a temperature within an approximate temperature range of 75° C. to 250° C.

17. The magnetron sputtering process of claim 12 wherein the substrates are heated to a temperature within an approximate temperature range of 200° C. to 250° C.

18. The magnetron sputtering process of claim 7 wherein the C-axes of the hexagonal close-packed magnetic layer have a preferred orientation substantially parallel to the surface of the thin film magnetic layer and a preference for the C-axes to align with the circumferential texture on the substrate.

19. The magnetron sputtering process of claim 18 wherein the sputtering thin film protective layer above the magnetic layer includes carbon.

20. A process for producing thin film magnetic longitudinal recording disks having a coercive anisotropy with a larger coercivity in a circumferential direction than in a radial direction of a disk, comprising the steps of:
   texturing a substrate with grooves;
   heating the textured substrate to a temperature between approximately 75° C. to approximately 250° C.;
   sputtering a thin film nucleating layer with crystals above the textured substrate; and
   sputtering a thin film magnetic layer above the nucleating layer, the magnetic layer comprising a hexagonal close-packed cobalt alloy with C-axes and having an epitaxial relationship with a preferred crystallographic orientation with the nucleating layer crystals and an anisotropy of coercivity, wherein the coercivity in the circumferential direction exceeds the coercivity in the radial direction and wherein the magnetic layer has a preferred orientation of C-axes parallel to the surface of the thin film magnetic layer.

21. The process of claim 20 where the magnetic layer has a preference for the C-axes parallel to the surface of the thin film magnetic layer to orient in the circumferential direction.

22. The process of claim 20 wherein a majority of the grooves are concentric.

23. The process of claim 20 wherein a majority of the grooves are in the circumferential direction and are intentionally not concentric.

24. The process of claim 20 wherein the thin film nucleating layer comprises a body centered cubic material.

25. The process of claim 24 wherein the thin film nucleating layer contains chromium.

26. The process of claim 20 wherein the substrate has a non-magnetic surface layer which is textured.

27. The process of claim 26 wherein the non-magnetic surface layer contains nickel phosphorous.

28. The process of claim 20 wherein a majority of the C-axes of the magnetic layer are oriented substantially parallel to the surface of the thin film magnetic layer.

29. The process of claim 20 wherein the substrate is nickel phosphorous plated aluminum.

30. The process of claim 20 further including sputtering a thin film protective layer above the magnetic layer.

31. A process for producing thin film magnetic longitudinal recording disks having a coercive anisotropy with a larger coercivity in a circumferential direction than in a radial direction of a disk, comprising the steps of:
   providing a substrate textured with grooves;
   heating the substrate to a temperature range of approximately 75° C. to approximately 250° C.;
   sputtering a thin film nucleating layer above the substrate and comprising crystals, the nucleating layer having a preferred crystallographic orientation that establishes a preferred crystallographic orientation of subsequent magnetic layer crystals; and
   sputtering a thin film magnetic layer above the thin film nucleating layer, the thin film magnetic layer comprising a hexagonal close-packed cobalt alloy with C-axes and with a preferred orientation of C-axes parallel to the surface of the thin film magnetic layer and with a preference for the C-axes to align with the grooves, wherein coercivity in the circumferential direction exceeds the coercivity in the radial direction.

32. The process of claim 31 wherein a majority of the C-axes of the magnetic layer are oriented substantially parallel to the surface of the magnetic layer.

33. The process of claim 31 wherein the substrate is nickel phosphorous plated.

34. The process of claim 31 wherein a majority of the grooves are in the circumferential direction and are intentionally not concentric.

35. The process of claim 31 wherein a majority of the grooves are concentric.

36. The process of claim 31 wherein the thin film nucleating layer comprises a body centered cubic material.

37. The process of claim 31 wherein the thin film nucleating layer contains chromium.

38. A process for producing thin film magnetic longitudinal recording disks having a coercive anisotropy with a larger coercivity in a circumferential direction than in a radial direction of a disk, comprising the steps of:
   texturing a substrate with grooves;
   sputtering a thin film nucleating layer comprising crystals; and
   sputtering a thin film magnetic layer above the nucleating layer, the magnetic layer comprising a hexagonal close-packed cobalt alloy with C-axes and having an epitaxial relationship with a preferred crystallographic orientation of the nucleating layer crystals and an anisotropy of coercivity, wherein the coercivity in the circumferential direction exceeds the coercivity in the radial direction.

39. The process of claim 38 wherein the magnetic layer has a preferred orientation of C-axes parallel to the surface of the thin film magnetic layer.

40. The process of claim 38 wherein the magnetic layer has a preference for the C-axes parallel to the surface of the thin film magnetic layer to orient in the circumferential direction.

41. The process of claim 38 wherein a majority of the grooves are in the circumferential direction and are intentionally not concentric.

42. The process of claim 38 wherein a majority of the grooves are concentric.

43. The process of claim 38 wherein the thin film nucleating layer comprises a body centered cubic material.

44. The process of claim 43 wherein the thin film nucleating layer contains chromium.

45. The process of claim 38 wherein the substrate has a non-magnetic surface layer which is textured with grooves.

46. The process of claim 45 wherein the non-magnetic surface layer contains nickel phosphorous.

47. The process of claim 38 wherein a majority of the C-axes of the hexagonal close-packed magnetic layer are oriented substantially parallel to the surface of the thin film magnetic layer.

48. The process of claim 38 wherein the substrate is nickel phosphorous plated.

49. The process of claim 38 further including sputtering a thin film protective layer above the magnetic layer.

50. The process of claim 49 wherein the thin film protective layer includes carbon.

51. A process for producing thin film magnetic longitudinal recording disks having a magnetic anisotropy comprising the steps of:

providing a substrate textured with grooves;

heating the substrate;

sputtering a thin film nucleating layer above the substrate, said nucleating layer comprising crystals; and sputtering a thin film magnetic layer above the nucleating layer, the magnetic layer comprising a hexagonal close-packed cobalt alloy with C-axes and having an epitaxial relationship with a preferred crystallographic orientation of the nucleating layer crystals and a coercive anisotropy, wherein a coercivity in a circumferential direction exceeds a coercivity in a radial direction.

52. The process of claim 51 where the magnetic layer has a preferred orientation of the C-axes parallel to the surface of the thin film magnetic layer and with a preference for the C-axes to align in the circumferential direction.

53. The process of claim 52 wherein the majority of the grooves are in the circumferential direction and are intentionally not concentric.

54. The process of claim 53 wherein a thin film nucleating layer comprises a body centered cubic material.

55. The process of claim 54 wherein the thin film nucleating layer contains chromium.

56. The process of claim 55 wherein the substrate has a non-magnetic surface layer which is textured.

57. The process of claim 56 wherein the non-magnetic surface layer contains nickel phosphorous.

58. The process of claim 51 wherein the substrate is nickel phosphorous plated.

59. The process of claim 58 further including sputtering a thin film protective layer above the magnetic layer.

60. The process of claim 51 wherein the substrate is textured with grooves that extend in the circumferential direction of the disk.

61. The process of claim 51 wherein the majority of the C-axes of the hexagonal close-packed magnetic layer are oriented substantially parallel to the surface of the thin film magnetic layer.

62. A process for producing thin film magnetic longitudinal recording disks having a coercive anisotropy with a larger coercivity in a circumferential direction than in a radial direction of a disk, comprising the steps of:

texturing a substrate with grooves;

heating the textured substrate to a temperature range of approximately 75° C. to approximately 250° C.;

sputtering a thin film nucleating layer above the textured disk substrate, the nucleating layer comprises a body centered cubic material with crystals; and sputtering a thin film magnetic layer above the nucleating layer, the magnetic layer comprising a crystalline hexagonal close-packed material with C-axes, containing cobalt, and having an epitaxial relationship with a preferred crystallographic orientation of the nucleating layer crystals and the magnetic layer crystals, and with a coercive anisotropy, wherein the coercivity in the circumferential direction exceeds the coercivity in the radial direction and wherein there is a preferred orientation of C-axes parallel to the surface of the thin film magnetic layer with a preference for the C-axes parallel to the surface of the thin film magnetic layer to orient in the circumferential direction.

63. The process of claim 62 further including sputtering a thin film protective layer above the magnetic layer.

64. The process of claim 63 wherein the substrate is a nickel phosphorous plated disk.

65. The process of claim 64 wherein a majority of the grooves are in the circumferential direction and are intentionally not concentric.

66. The process of claim 65 wherein the thin film nucleating layer contains chromium.

67. A process for producing thin film magnetic longitudinal recording disks having a coercive anisotropy with a larger coercivity in a circumferential direction than in a radial direction of a disk, comprising the steps of:

texturing a substrate with grooves;

heating the textured substrate to a temperature of approximately 200° C. to approximately 250° C.;

sputtering a thin film nucleating layer above the textured substrate, said nucleating layer comprising crystals; and sputtering a thin film magnetic layer above the nucleating layer, the magnetic layer having an epitaxial relationship with a preferred crystallographic orientation of the nucleating layer crystals and a coercive anisotropy, wherein the coercivity in the circumferential direction exceeds the coercivity in the radial direction, and the magnetic layer is a hexagonal close-packed cobalt alloy above the nucleating layer with a preferred orientation of C-axes parallel to the surface of the thin film magnetic layer.

68. The process of claim 67 wherein the thin film nucleating layer comprises a body centered cubic material.

69. The process of claim 68 wherein the thin film nucleating layer contains chromium.

70. The process of claim 69 wherein a majority of the grooves are in the circumferential direction.

71. The process of claim 70 wherein the thin film magnetic layer has a preference for the C-axes parallel to the surface of the thin film magnetic layer to orient in the circumferential direction.

72. The process of claim 71 wherein the substrate has a non-magnetic surface layer which is textured with grooves.

73. The process of claim 72 wherein the non-magnetic surface layer contains nickel phosphorous.

74. The process of claim 73 further including sputtering a thin film protective layer above the magnetic layer.

75. A sputtering production process for producing thin film magnetic longitudinal recording disks from textured substrates having a preferred orientation of the magnetic layer C-axes in a circumferential direction, comprising the steps of:

providing a textured substrate with a majority of texturing grooves in the circumferential direction;

heating the substrate;

sputtering a thin film nucleating layer above the substrate; and sputtering a thin film magnetic layer above the nucleating layer, the magnetic layer having an epitaxial relationship with a preferred crystallographic orientation of crystals of the nucleating layer and a coercive anisotropy, wherein the coercivity in the circumferential direction exceeds the coercivity in the radial direction, and the magnetic layer forms a hexagonal close-packed cobalt alloy above the nucleating layer with a preferred orientation of C-axes parallel to the surface of the thin film magnetic layer and a preference for the C-axes parallel to the surface of the magnetic layer to orient circumferentially.

76. The sputtering production process of claim 75 wherein the thin film nucleating layer comprises a body centered cubic material.

77. The sputtering production process of claim 76 wherein the thin film nucleating layer contains chromium.

78. The sputtering production process of claim 77 wherein the non-magnetic surface layer contains nickel phosphorous.

79. The sputtering production process of claim 78 further including sputtering a thin film protective layer above the magnetic layer.

80. The sputtering production process of claim 79 wherein the substrate is heated to a temperature within a range of approximately 75° C. to approximately 250° C.

81. A process for producing thin film magnetic longitudinal recording disks having a magnetization anisotropy in a circumferential direction relative to a radial direction, comprising the steps of:

texturing a substrate with grooves wherein the majority of the grooves are in the circumferential direction;

heating the textured substrate;

sputtering a thin film nucleating layer above the textured substrate, said nucleating layer comprising crystals;

sputtering a thin film magnetic layer above the nucleating layer, the magnetic layer having an epitaxial relationship with a preferred crystallographic orientation with the nucleating layer crystals and a magnetic anisotropy, wherein a squareness of hysteresis loop of a disk in the circumferential direction is greater than the squareness of the hysteresis loop of said disk in the radial direction and wherein the magnetic layer comprises a hexagonal close-packed cobalt alloy with C-axes.

82. The process of claim 81 wherein the thin film nucleating layer comprises a body centered cubic material.

83. The process of claim 82 wherein the thin film nucleating layer contains chromium.

84. The process of claim 83 wherein a majority of C-axes of the hexagonal close-packed magnetic layer are oriented substantially parallel to the surface of the thin film magnetic layer.

85. The process of claim 84 wherein the substrate has a non-magnetic surface layer which contains nickel phosphorous.

86. The process of claim 85 wherein the substrate is nickel phosphorous plated aluminum.

87. The process of claim 82 wherein the substrates are heated to a temperature within a temperature range of approximately 75° C. to approximately 250° C.

88. The process of claim 87 wherein the C-axes of the hexagonal close-packed magnetic layer have a preferred orientation substantially parallel to the surface of the thin film magnetic layer and with a preference for the C-axes to align in the circumferential direction.

89. The process of claim 82 wherein the substrates are heated to a temperature within a temperature range of approximately 200° C. to approximately 250° C.

* * * * *